United States Patent
Lee et al.

(10) Patent No.: US 8,958,121 B2
(45) Date of Patent: Feb. 17, 2015

(54) SCANNING TECHNOLOGY USING INPUT DEVICE TO ACQUIRE SCAN IMAGE THROUGH SCAN AREA

(71) Applicant: LG Electronics Inc., Seoul (KR)

(72) Inventors: Jungyong Lee, Seoul (KR); Bumsang Lee, Seoul (KR); Injik Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/184,315

(22) Filed: Feb. 19, 2014

(65) Prior Publication Data

US 2014/0168723 A1    Jun. 19, 2014

Related U.S. Application Data

(63) Continuation of application No. 13/246,899, filed on Sep. 28, 2011, now Pat. No. 8,674,938.

(30) Foreign Application Priority Data

Jun. 22, 2011 (KR) ........................ 10-2011-0060581
Jun. 22, 2011 (KR) ........................ 10-2011-0060583

(51) Int. Cl.
*G06K 15/10* (2006.01)
*H04N 1/00* (2006.01)
(Continued)

(52) U.S. Cl.
CPC ....... *H04N 1/00352* (2013.01); *H04N 1/00127* (2013.01); *H04N 1/00236* (2013.01); *H04N 1/00392* (2013.01); *H04N 1/00816* (2013.01); *H04N 1/107* (2013.01); *G06F 3/03543* (2013.01); *H04N 1/00129* (2013.01); *H04N 1/028* (2013.01); *H04N 2201/0081* (2013.01); *H04N 2201/0416* (2013.01)
USPC ........... 358/1.5; 358/505; 358/474; 358/1.16; 358/1.17

(58) Field of Classification Search
CPC .......... H04N 1/00236; H04N 1/00352; H04N 1/00816; H04N 2201/0081
USPC ............... 358/406, 504–506, 474, 1.16–1.17; 345/156–172
See application file for complete search history.

(56) References Cited

U.S. PATENT DOCUMENTS 5,311,208 A * 5/1994 Burger et al. ................. 345/163
6,178,015 B1   1/2001 Lee et al.
(Continued)

FOREIGN PATENT DOCUMENTS

CN    1543185 A    11/2004
CN    101998022 A   3/2011
(Continued)

OTHER PUBLICATIONS

TechSmith Corporation, SnagIt 9.0—Help File PDF, 2008.*
(Continued)

*Primary Examiner* — Benny Q Tieu
*Assistant Examiner* — Quyen V Ngo
(74) *Attorney, Agent, or Firm* — Birch, Stewart, Kolasch & Birch, LLP

(57) ABSTRACT

Scanning technology, in which one or more electronic communications that designate a scan area of an object are received from an input apparatus. A preview scan area is displayed based on the received one or more electronic communications that designate the scan area of the object.

21 Claims, 22 Drawing Sheets

(51) Int. Cl.
*H04N 1/107* (2006.01)
*G06F 3/0354* (2013.01)
*H04N 1/028* (2006.01)

(56) References Cited

U.S. PATENT DOCUMENTS

| | | | |
|---|---|---|---|
| 6,249,360 B1 | 6/2001 | Pollard et al. | |
| 6,859,290 B2 | 2/2005 | Mishima et al. | |
| 7,203,911 B2* | 4/2007 | Williams | 715/864 |
| 7,456,981 B2 | 11/2008 | Kuboki | |
| 7,675,528 B2 | 3/2010 | Walker, Jr. et al. | |
| 7,984,386 B1* | 7/2011 | Zuverink | 715/800 |
| 2001/0025326 A1 | 9/2001 | Kizaki | |
| 2001/0035983 A1 | 11/2001 | Abe | |
| 2001/0048447 A1 | 12/2001 | Jogo | |
| 2002/0052547 A1 | 5/2002 | Toida | |
| 2002/0054133 A1* | 5/2002 | Jameson | 345/788 |
| 2002/0054715 A1 | 5/2002 | Os et al. | |
| 2002/0126147 A1 | 9/2002 | Lavendel et al. | |
| 2004/0017354 A1* | 1/2004 | Muranami | 345/156 |
| 2004/0057635 A1 | 3/2004 | Cheng et al. | |
| 2004/0109589 A1 | 6/2004 | McClurg et al. | |
| 2004/0208369 A1 | 10/2004 | Nakayama | |
| 2004/0212835 A1 | 10/2004 | Neff et al. | |
| 2006/0103877 A1 | 5/2006 | Lee et al. | |
| 2006/0143154 A1 | 6/2006 | Jager | |
| 2006/0235943 A1 | 10/2006 | Nakai | |
| 2008/0216721 A1* | 9/2008 | Nagai et al. | 112/102.5 |
| 2009/0313142 A1 | 12/2009 | Kiruma et al. | |
| 2010/0123907 A1* | 5/2010 | Edgar et al. | 358/1.5 |
| 2010/0124384 A1 | 5/2010 | Edgar et al. | |
| 2010/0296129 A1 | 11/2010 | Zahnert et al. | |
| 2011/0316884 A1* | 12/2011 | Giambalvo et al. | 345/660 |
| 2012/0062732 A1 | 3/2012 | Marman et al. | |
| 2012/0327483 A1 | 12/2012 | Lee et al. | |
| 2012/0327484 A1 | 12/2012 | Lee et al. | |

FOREIGN PATENT DOCUMENTS

| | | |
|---|---|---|
| EP | 0991263 A2 | 4/2000 |
| EP | 2254325 A1 | 11/2010 |
| JP | 02-231864 A | 9/1990 |

OTHER PUBLICATIONS

European Search Report dated Feb. 10, 2012 for Application No. EP11182626, 5 pages.

* cited by examiner fig.2
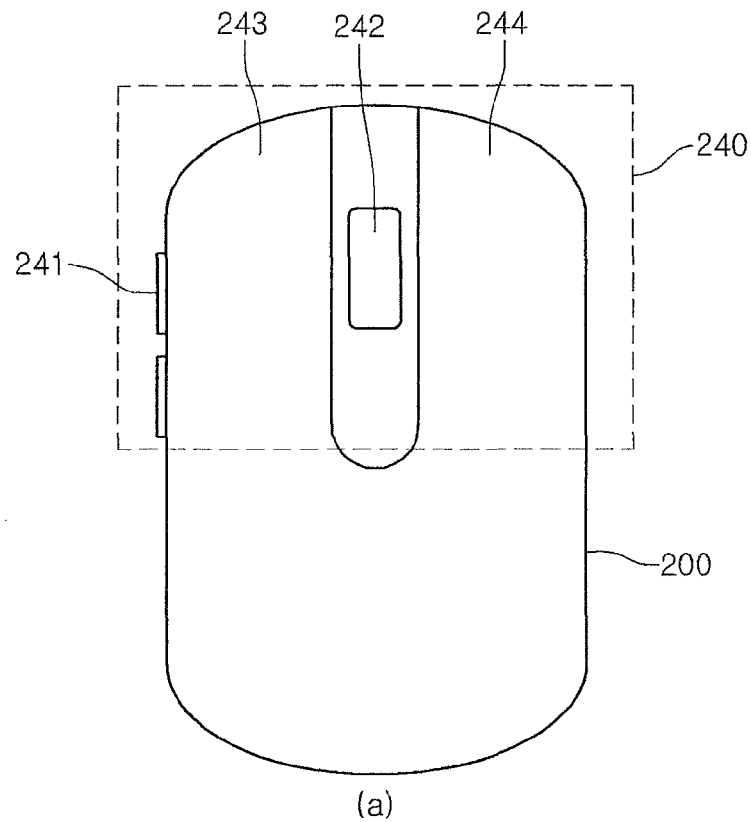
(a)
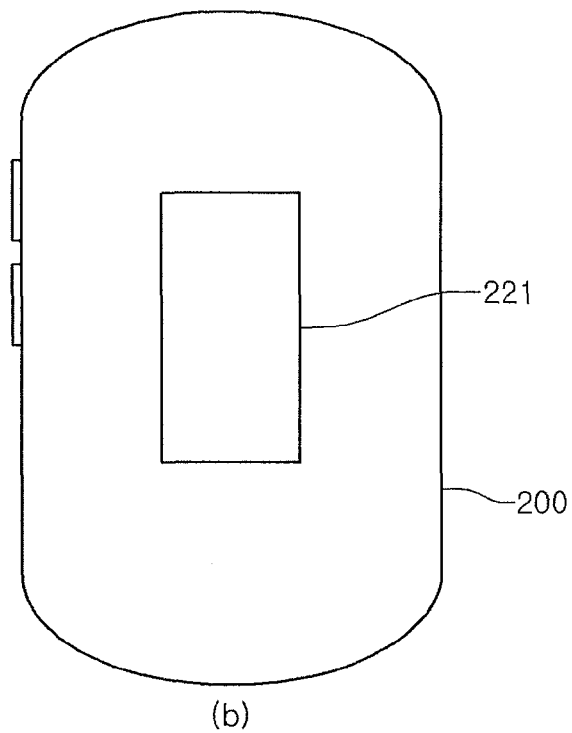
(b)

fig.8
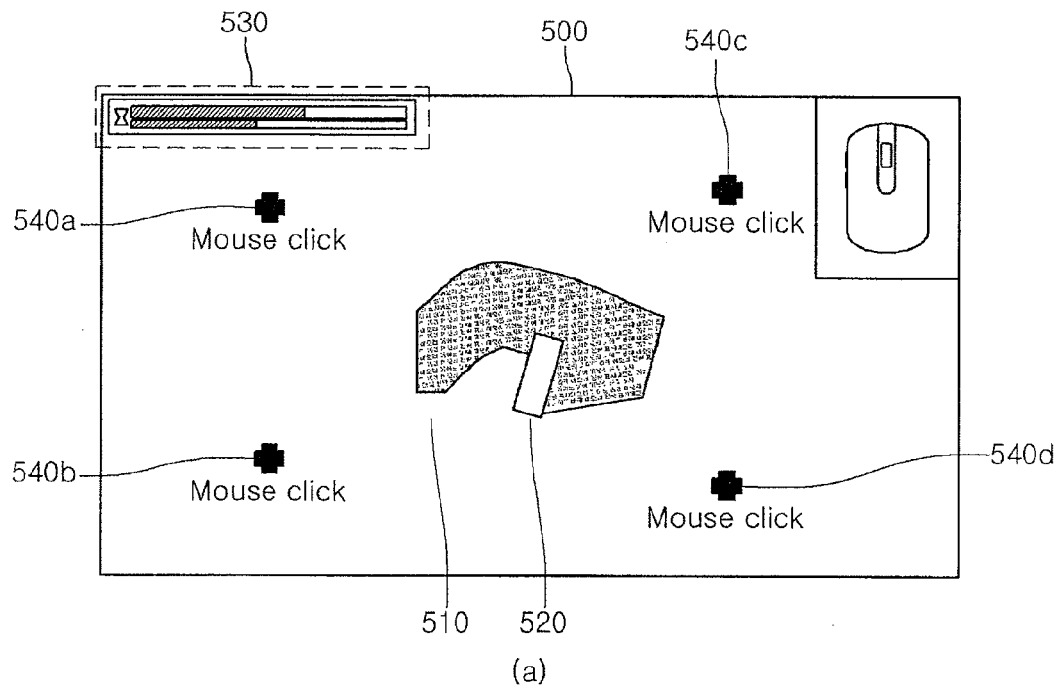
(a)
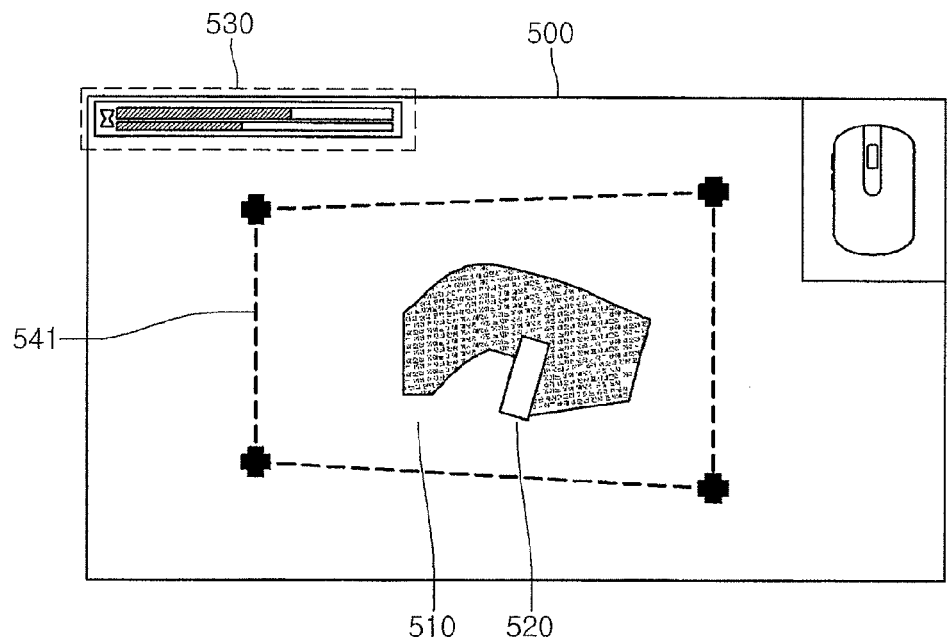
(b)

fig.9
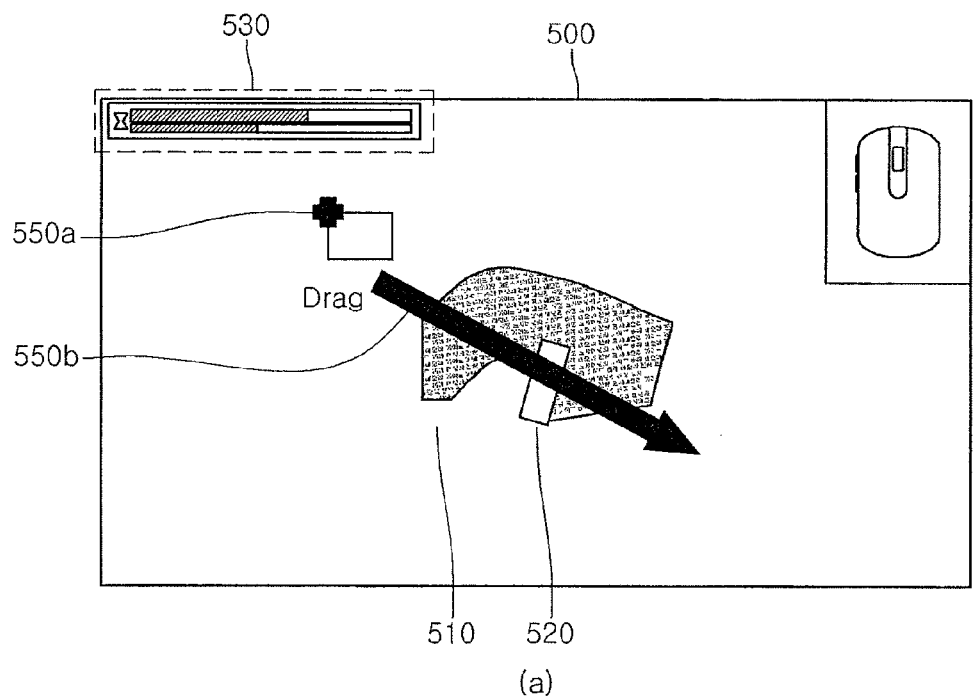
(a)
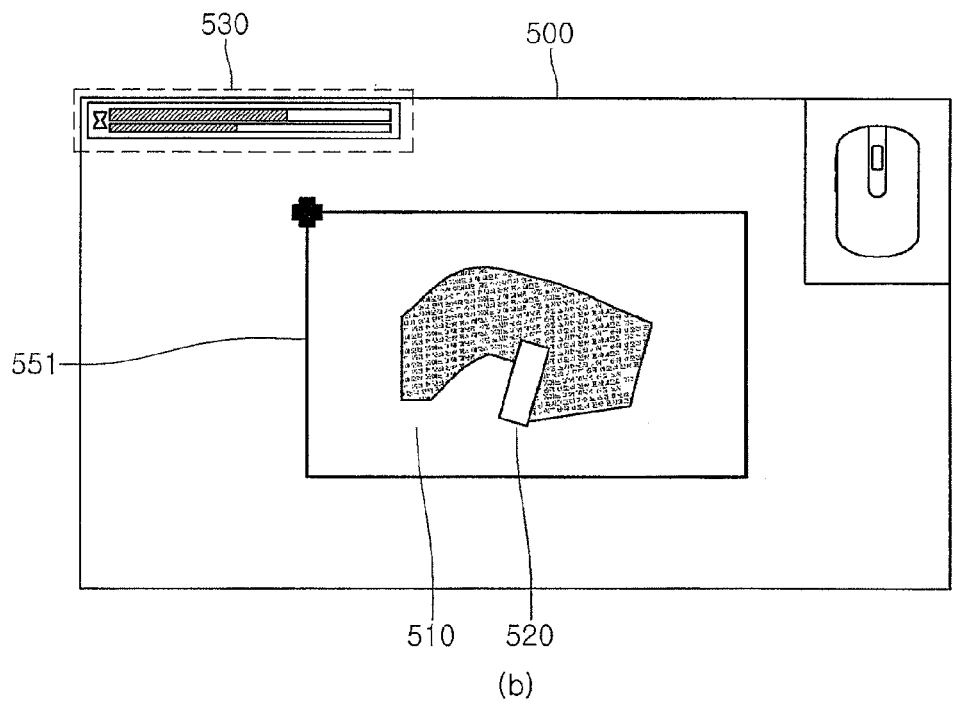
(b)

fig.14
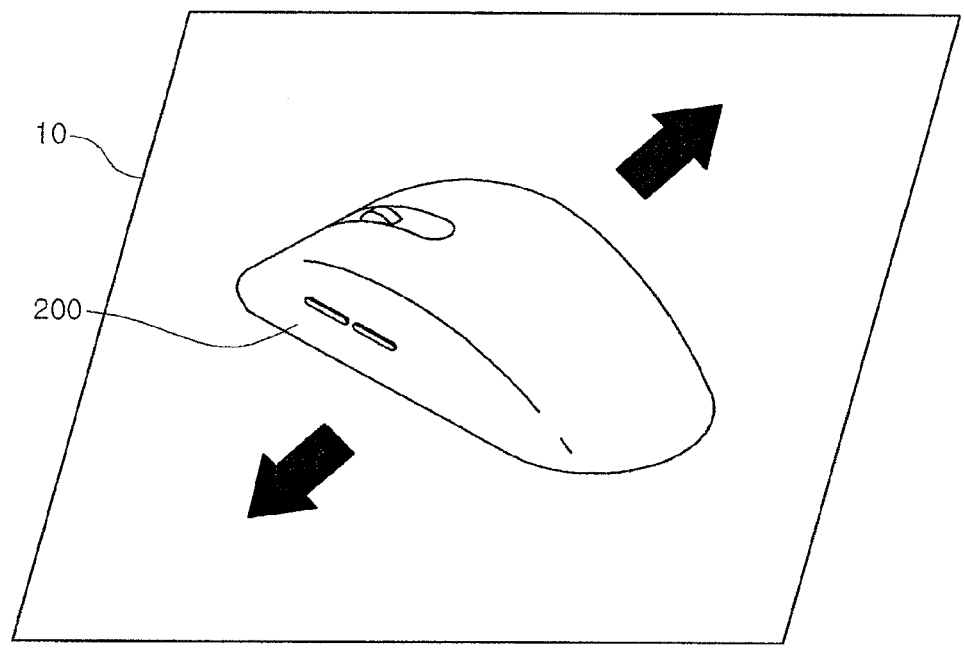
(a)
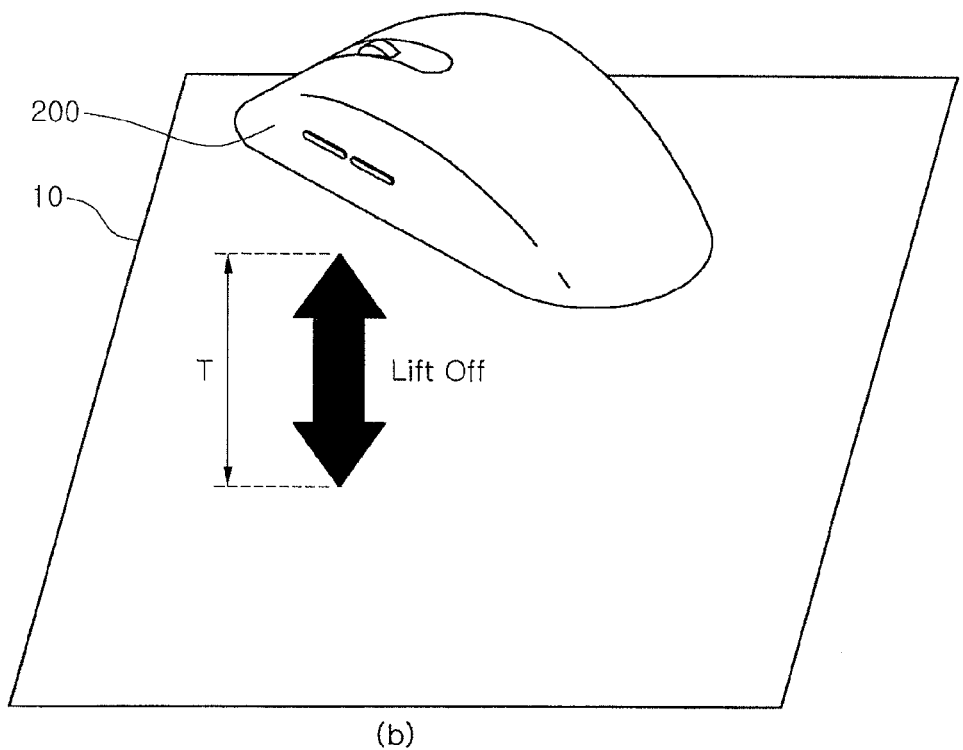
(b)

fig.18
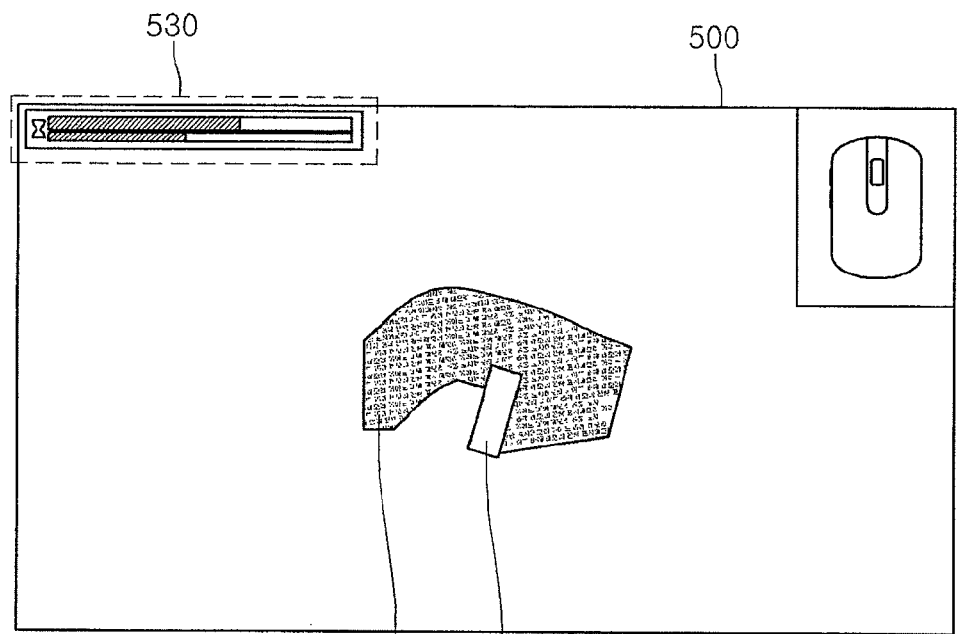
(a)
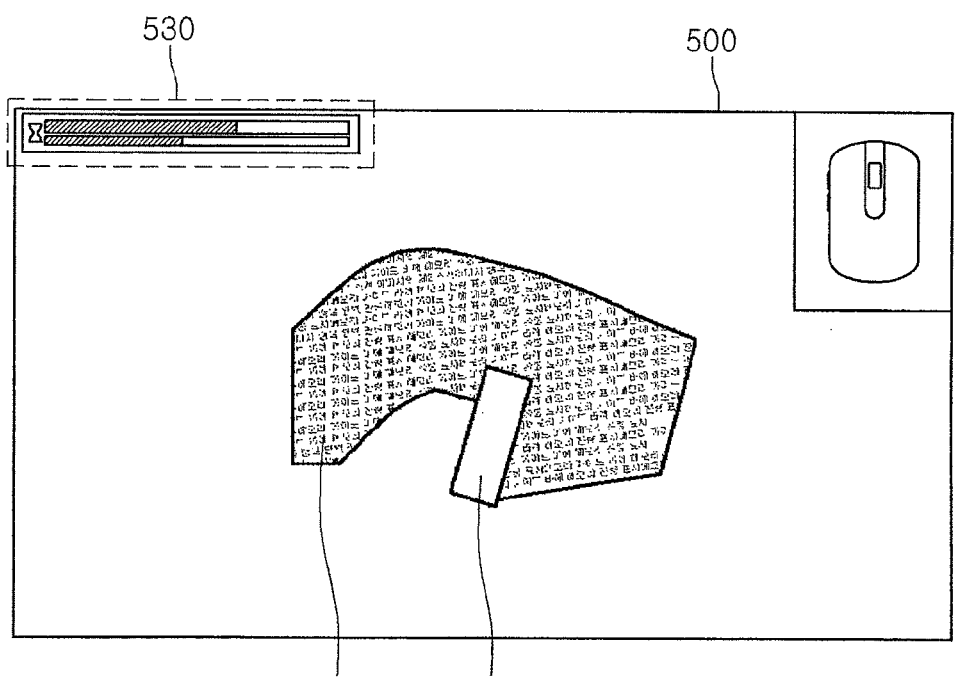
(b)

fig.19
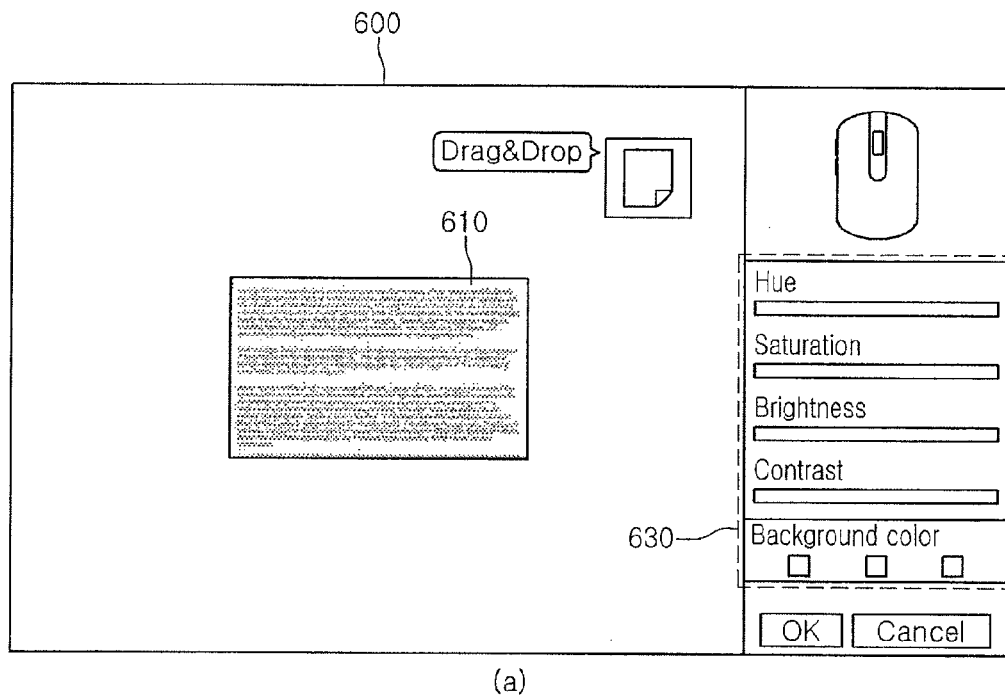
(a)
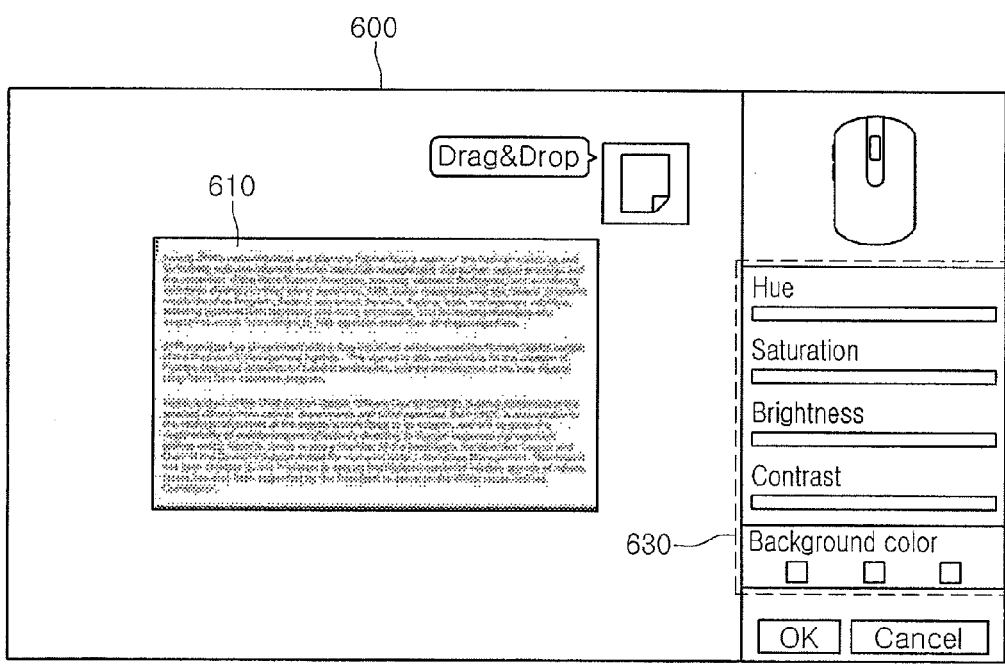
(b)

fig.21
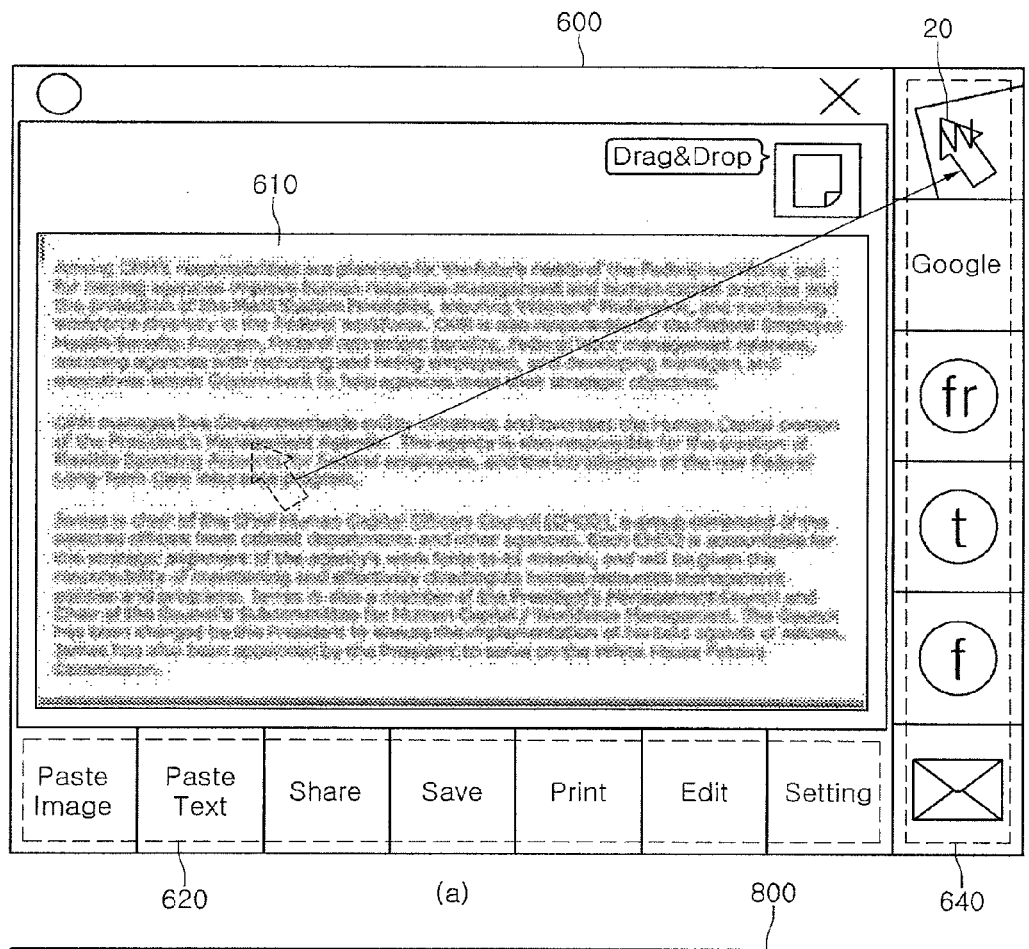
(a)
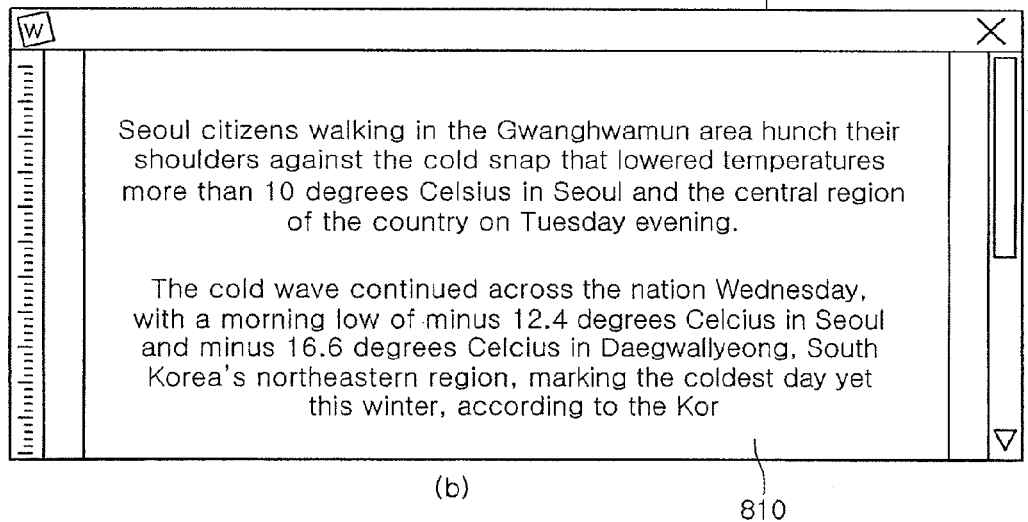
(b)

fig.23
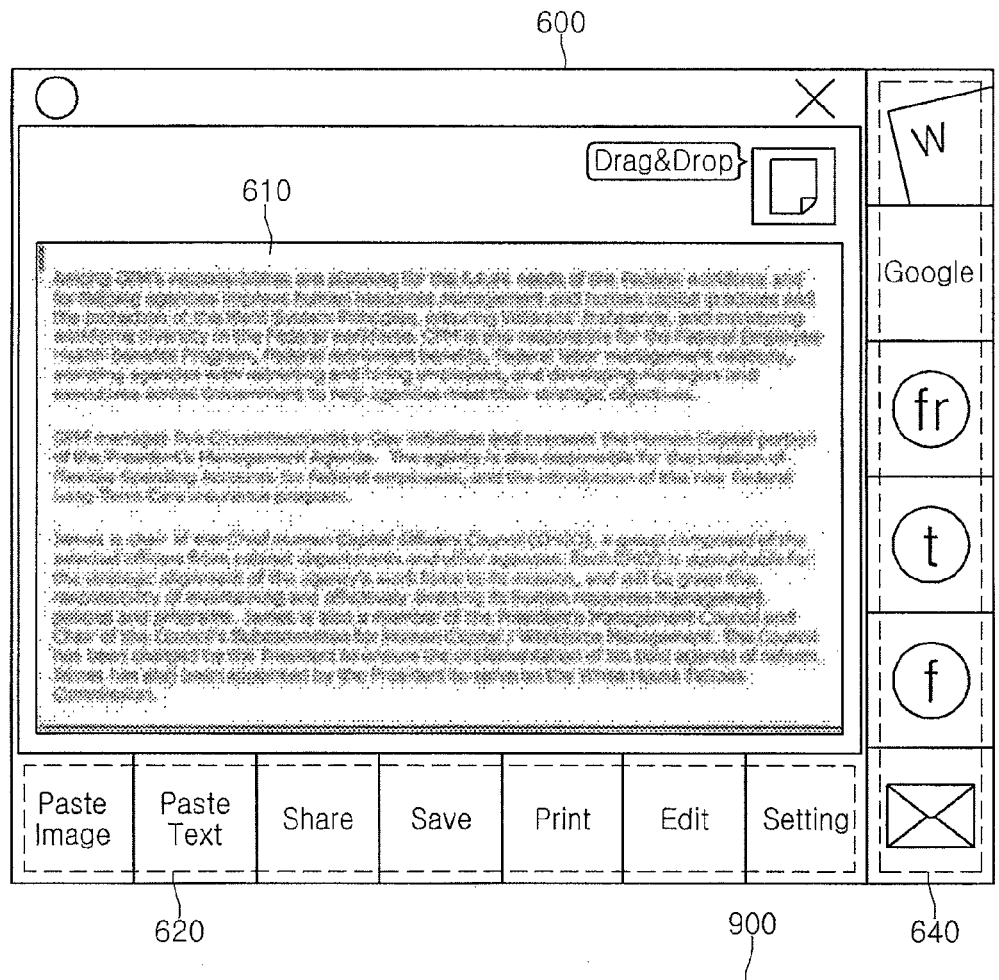
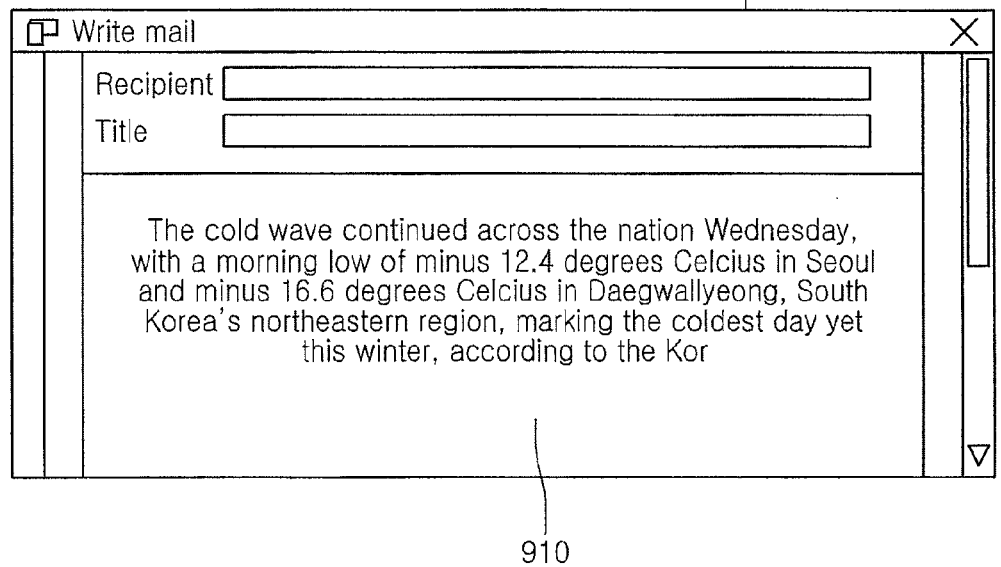

SCANNING TECHNOLOGY USING INPUT DEVICE TO ACQUIRE SCAN IMAGE THROUGH SCAN AREA

CROSS-REFERENCE TO RELATED APPLICATIONS

This application is a Continuation of co-pending application Ser. No. 13/246,899 filed on Sep. 28, 2011, which claims priority to Application Nos. 10-2011-0060581 and 10-2011-0060583 filed in Korea, on Jun. 22, 2011. The entire contents of all of the above applications are hereby incorporated by reference.

FIELD

The present disclosure relates to scanning technology.

BACKGROUND

In general, a multifunction apparatus having a scan function reads document data from a page of a document to be scanned, prints the read document data or transmits the read document data to the outside by using a communication apparatus such as a modem. Therefore, the multifunction apparatus in the related art having the scan function may have a predetermined scan size. Further, since the multifunction apparatus in the related art having the scan function may have limited portability, an object to be scanned should be moved to the multifunction apparatus that is fixedly installed in order to scan simple images such as a business card photograph, and the like.

SUMMARY

In one aspect, a method includes controlling display of an interface area related to scanning an object and receiving, from an input apparatus that is movable, one or more electronic communications that identify points of a scan area of the object. The points of the scan area have been set based on user movement of the input apparatus to locations over the object and user input provided when the input apparatus was positioned at the locations over the object. The method also includes defining the scan area based on the one or more electronic communications that identify points of the scan area and controlling display of a preview scan area that corresponds to the defined scan area.

Implementations may include one or more of the following features. For example, the method may include receiving click signals that identify points of the scan area, where each click signal has been received based on user movement of the input apparatus to a location over the object and a click input provided when the input apparatus was positioned at the location over the object. In this example, the method may include defining the scan area based on the click signals.

In addition, the method may include receiving a click signal at a first location over the object and receiving a drag signal that represents movement from the first location over the object to a second location over the object. The method also may include defining the scan area based on the click signal and the drag signal. The method further may include controlling display of a scan guide map in which the preview scan area and the scan box are downscaled at a predetermined rate.

In some implementations, the method may include receiving, from the input apparatus, a scan start request signal and controlling display of a scan image of the object corresponding to the preview scan area based on the scan start request signal. In these implementations, the method may include receiving positional data of the input apparatus and controlling display of a scan box corresponding to the received positional data. Also, in these implementations, the method may include judging whether the scan box is positioned within the preview scan area and changing display of the scan box or outputting a warning message when the judgment reveals that the scan box is positioned outside of the preview scan area. Further, in these implementations, the method may include outputting a predetermined sound or predetermined vibration when the judgment reveals that the scan box is positioned outside of the preview scan area.

In another aspect, an input apparatus includes an input unit configured to receive user input and a scanning unit configured to acquire an image of an object. The input apparatus also includes a position detecting unit configured to detect positional data of the input apparatus when moved by a user to locations over the object and a control unit configured to set points of a scan area of the object based on the detected positional data of the input apparatus and user input received by the input unit when the input apparatus was positioned at the locations over the object. The input apparatus further includes a communication interface unit configured to transmit, to an apparatus, one or more electronic communications that identify points of the scan area of the object.

Implementations may include one or more of the following features. For example, the input unit may be configured to receive click signals and the control unit is configured to set points of the scan area of the object based on the detected positional data of the input apparatus and the click signals. In this example, the input unit may be configured to receive a click signal at a first location over the object and a drag signal that represents movement from the first location over the object to a second location over the object and the control unit is configured to set points of the scan area of the object based on the detected positional data of the input apparatus and the click signal and the drag signal.

In yet another aspect, a method for pointing a scan area includes receiving, through an input unit of an input apparatus, user input and acquiring, through a scanning unit of the input apparatus, an image of an object. The method also includes detecting, through a position detecting unit of the input apparatus, positional data of the input apparatus when moved by a user to locations over the object and setting, through a control unit of the input apparatus, points of a scan area of the object based on the detected positional data of the input apparatus and user input received by the input unit when the input apparatus was positioned at the locations over the object. The method further includes transmitting, to an apparatus and from a communication interface unit of the input apparatus, one or more electronic communications that identify points of the scan area of the object.

Implementations may include one or more of the following features. For example, the method may include determining that the image of the object is acquired outside of the scan area and outputting a warning message based on the determination that the image of the object is acquired outside of the scan area.

In yet another aspect, a method includes controlling display of an interface area related to scanning an object and controlling display, on the interface area, of an image of at least a portion of the object acquired through an input apparatus that is movable. The method also includes receiving positional data that describes movement of the input apparatus and controlling display, on the interface area, of a scan box based on the received positional data. In controlling display of the scan box, the method includes determining a velocity at which the input apparatus is being moved based on the received positional data, comparing the determined velocity at which the input apparatus is being moved with the threshold velocity, and changing display of the scan box when the determined velocity at which the input apparatus is being moved meets the threshold velocity.

Implementations may include one or more of the following features. For example, the method may include determining that the determined velocity at which the input apparatus is being moved is higher than the threshold velocity and changing display of the scan box based on the determination that the determined velocity at which the input apparatus is being moved is higher than the threshold velocity, changing display of the scan box. The method may include changing a color of the scan box and/or changing a shape of the scan box.

In yet another aspect, an apparatus includes a communication interface unit configured to receive a scan image of an object acquired through an input apparatus and positional data that describes movement of the input apparatus. The apparatus also includes a control unit configured to control display of an interface area related to scanning an object, control display of the image received through the communication interface unit, and control display of a scan box based on the received positional data. In controlling display of the scan box, the apparatus determines a velocity at which the input apparatus is being moved based on the received positional data, compares the determined velocity at which the input apparatus is being moved with the threshold velocity, and changes display of the scan box when the determined velocity at which the input apparatus is being moved meets the threshold velocity.

In yet another aspect, an input apparatus includes a scanning unit configured to acquire an image of an object and a position detecting unit configured to detect positional data that describes movement of the input apparatus. The input apparatus also includes a communication interface unit configured to transmit, to an apparatus, the image and the positional data, thereby enabling the apparatus to control display of the image and control display of a scan box based on the positional data. The input apparatus enables the apparatus to determine a velocity at which the input apparatus is being moved based on the received positional data, compare the determined velocity at which the input apparatus is being moved with the threshold velocity, and change display of the scan box when the determined velocity at which the input apparatus is being moved meets the threshold velocity.

Implementations of the described techniques may include hardware, a method or process implemented at least partially in hardware, or a computer-readable storage medium encoded with executable instructions that, when executed by a processor, perform operations.

The details of one or more implementations are set forth in the accompanying drawings and the description below. Other features will be apparent from the description and drawings, and from the claims.

BRIEF DESCRIPTION OF THE DRAWINGS

FIG. 2 is a plan view and a bottom view of an example input apparatus having a scan function.

FIGS. 8 to 12 are diagrams showing a screen providing an example scan UI window displaying a preview scan area for acquiring a scan image.

FIG. 14 is a diagram showing an example state of an input apparatus when a lift-off signal is generated.

FIG. 18 is a diagram showing a screen providing an example scan UI window on which a scan image is displayed depending on a state change signal of an input apparatus.

FIG. 19 is a diagram showing a screen providing an example edition UI window on which an edition image is displayed depending on a state change signal of an input apparatus.

FIGS. 21 to 24 are diagrams showing a screen providing an example edition UI window for editing a scan image.

DETAILED DESCRIPTION

Hereinafter, a method for displaying a scan image and a display apparatus thereof, and a scan image forming system according to various examples will be described in detail with reference to the accompanying drawings.

Figure 1:
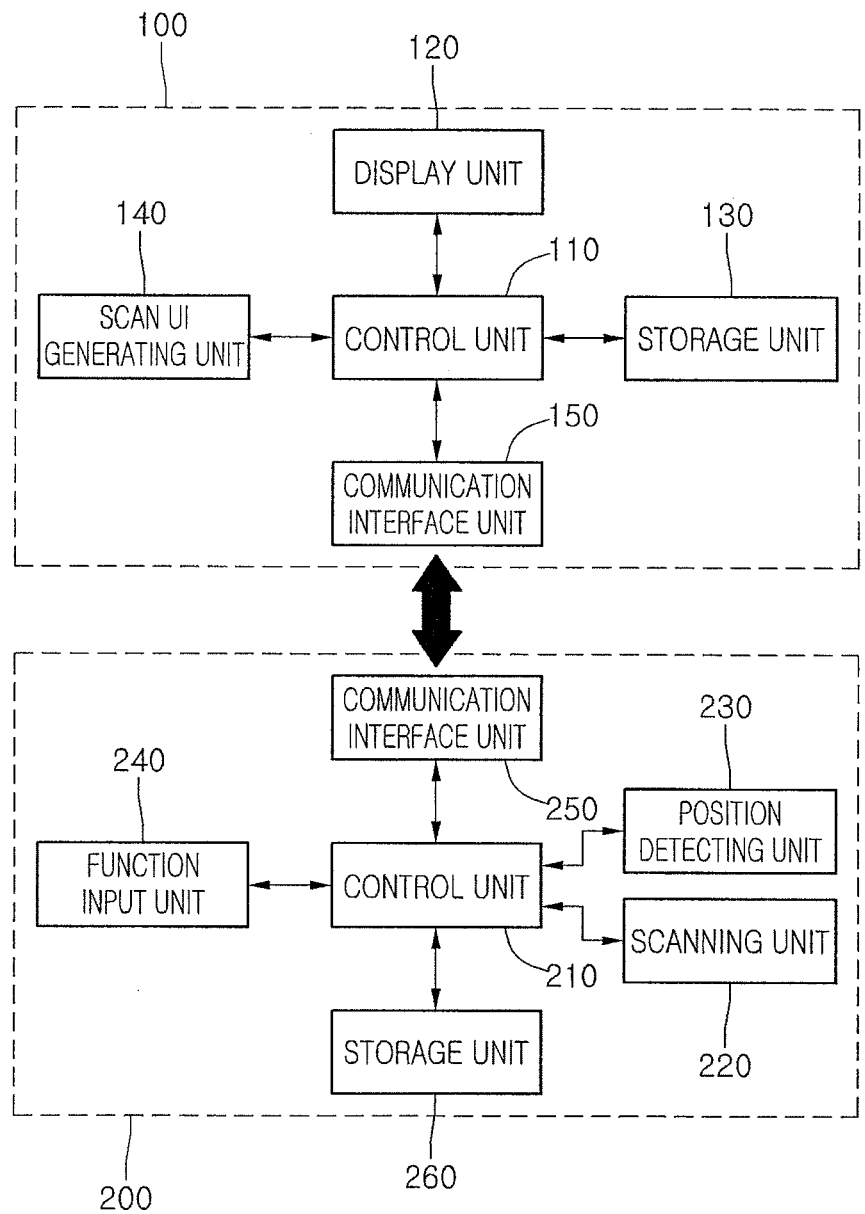
FIG. 1 is a diagram showing an example system.

FIG. 1 illustrates an example scan image forming system. Referring to FIG. 1, the scan image forming system includes a display apparatus 100 and an input apparatus 200.

The display apparatus 100 may execute a scan driver program in a computer, a digital TV, a cellular phone, and the like and may be any type of apparatus having a display unit.

The display apparatus 100 includes a control unit 110, a display unit 120, a storage unit 130, a scan UI generating unit 140, and a communication interface unit 150.

The control unit 110 may control general operations in the display apparatus 100. For example, the control unit may control the communication interface unit 150 to receive various input signals inputted from the outside and various data transmitted from the outside and may control the communication interface unit 150 to process the various received input signals and received data and display the processed signals or data on the display unit 120 or store the processed signals or data in the storage unit 130.

The display unit 120 converts various image signals, data signals, onscreen display (OSD) signals, and the like processed by the control unit 110 into R, G, and B signals, respectively, to generate driving signals.

To this end, the display unit 120 may adopt a plasma display panel (PDP), a liquid crystal display (LCD), an organic light emitting diode display (OLED), a flexible display, a three-dimensional (3D) display, and the like or is constituted by a touch screen to be used as an input apparatus in addition to an output apparatus.

In addition, the display unit 120 may display a scan UI window for displaying a scan image transmitted from the input apparatus 200 to be described below.

The storage unit 130 stores programs for processing and controlling the signals in the control unit 110 and may store an image, a sound, or a data signal which is signal-processed.

Further, the storage unit 130 may serve to temporarily store the image, sound, or data signal inputted from the communication interface unit 150.

In some implementations, the storage unit 130 may store a scan driver program for controlling the display apparatus to perform a scan operation.

The storage unit 130, for example, may include at least one type of storage medium of a flash memory type, a hard disk type, a multimedia card micro type, a card type memory (e.g., an SD or XD memory, or the like), a random access memory (RAM), and a read only memory ROM (EEPROM, or the like).

The scan UI generating unit 140 generates a scan UI window and an edition UI window for displaying an implementation state of the scan driver program on a screen. The generated scan UI window and the edition UI window are displayed on the screen through the display unit 120 and a user controls the scan operation of the input apparatus 200 through the scan UI window. Further, various scan control commands are generated by operating various function setting buttons provided on the scan UI window. In addition, various edition control commands are generated by operating various function setting buttons provided on the edition UI window.

The communication interface unit 150 performs wired/wireless communication with external apparatuses to receive various input signals and image, sound, or data signals from the external apparatuses.

When the communication interface unit 150 performs wired communication with the external apparatuses, the communication interface unit 150 may be constituted by a serial, a PS/2, a USB, and the like and when the communication interface unit 150 performs wireless communication with the external apparatuses, the communication interface unit 150 may be constituted by radio frequency identification (RFID), infrared data association (IrDA), ultra wideband (UWB), zigbee, digital living network alliance (DLNA), and the like.

The input apparatus 200 may be various input apparatuses having a scanner function, e.g., a mouse, a keyboard, a remote controller, and the like. Further, if the input apparatus 200 has the scanner function, the input apparatus 200 may be portable terminals such as the cellular phone, a personal media player (PMP), a personal digital assistant (PDA), and the like.

The input apparatus 200 includes a control unit 210, a scanning unit 220, a position detecting unit 230, a scan function inputting unit 240, a communication interface unit 250, and a storage unit 260.

The control unit 210 may control general operations in the input apparatus 200. For example, the control unit 210 may control a scan image of a scan target object acquired from the scanning unit 220 and positional data acquired from the position detecting unit 230 to be transmitted to external apparatuses through the communication interface unit 250 and may control the scan image and positional data to be stored in the storage unit 260.

Further, the control unit 210 may control signals associated with various functions inputted by the user through the function input unit 240 to be transmitted to the external apparatuses.

The scanning unit 220 serves to acquire scan images corresponding to the predetermined areas of the scan target object by radiating light to predetermined areas of the scan target object at the same time and detecting light reflected therefrom.

The scan target object represents an object containing information which the user intends to input/store in the input apparatus 200 and may include a document in which characters, figures, and the like are displayed. Further, the predetermined area of the scan target object represents a two-dimensional (2D) area having a predetermined area unlike the existing line scan area.

That is, the scanning unit 220 radiates light to the scan target object and radiates light to the 2D area having the predetermined area at the same time. Some of the radiated light is reflected from the scan target object and inputted into the scanning unit 220. The scanning unit 220 generates scan information by detecting the reflected light. For example, the scanning unit 220 may generate the scan information of a digital type in which a part with the detected reflection light is designated as one and a part with no detected reflection light is designated as zero.

Since the scan information contains information on the light-radiated part, e.g., the 2D area having the predetermined area, the scan image corresponding to the predetermined area of the scan target object can be acquired by imaging some or all of the scan information.

The position detecting unit 230 detects positional movement on X and Y axes with movement of the input apparatus 200. The method of detecting the information on the positional information and the positional information will be described below in more detail. Reference position data is stored in the storage unit 260 by acquiring an X and Y coordinate for a predetermined point. Thereafter, when the input apparatus 200 moves, a step of acquiring an X and Y coordinate for a new point and comparing new positional data with the reference position data stored in the storage unit 260 is repeatedly performed to detect the positional movement of the input apparatus 200.

The detected information on the positional movement of the input apparatus 200 matches the scan image acquired through the scanning unit 220 to be transmitted to the display apparatus 200.

The function input unit 240 may include a scanner function selecting button, a wheel button, and left and right buttons around the wheel button.

When the user inputs the scanner function selecting button, the input apparatus 200 generates a scan start request signal for entering a scan mode and an edition request signal for switching the scan mode to an edition mode.

The wheel button and the left and right buttons generate signals corresponding to functions allocated to each of the scan mode and the edition mode.

The communication interface unit 250 performs wired/wireless communication with external apparatuses and may transmit or receive various input signals and image, sound, or data signals to or from the external apparatuses.

When the communication interface unit 250 performs wired communication with the external apparatuses, the communication interface unit 250 may be constituted by a serial, a PS/2, a USB, and the like and when the communication interface unit 250 performs wireless communication with the external apparatuses, the communication interface unit 250 may be constituted by radio frequency identification (RFID), infrared data association (IrDA), ultra wideband (UWB), zigbee, digital living network alliance (DLNA), and the like.

The storage unit 260 may store the scan image acquired from the scanning unit 220 and the positional data and the information on the positional information acquired from the position detecting unit 230.

The storage unit 260, for example, may include at least one type of storage medium of a flash memory type, a hard disk type, a multimedia card micro type, a card type memory (e.g., an SD or XD memory, or the like), a RAM, and a ROM (EEPROM, or the like).

In addition, the input apparatus 200 may include a display unit. In this case, the display unit may adopt a PDP, an LCD, an OLED, a flexible display, a 3D display, and the like or is constituted by a touch screen to be used as an input apparatus in addition to an output apparatus.

Further, the display unit may display the scan image acquired from the scanning unit 220.

FIG. 2 illustrates an example input apparatus having a scan function. Referring to FIG. 2A, a plan view of a mouse which is one of examples of the input apparatus 200 is shown. The function input unit 240 receiving a plurality of functions is included in a front surface of the mouse 200. The function input unit 240 includes a scanner function selecting button 241, a wheel button 242, and left and right buttons 243 and 244 around the wheel button.

Referring to FIG. 2B, a real scan area 221 for acquiring the scan image from the scan target object is included in a rear surface of the mouse 200. The scanning unit 220 radiates light to the scan target object through the real scan area 221 and some of the radiated light is reflected from the scan target object to be inputted into the scanning unit 210 again.

Figure 3:
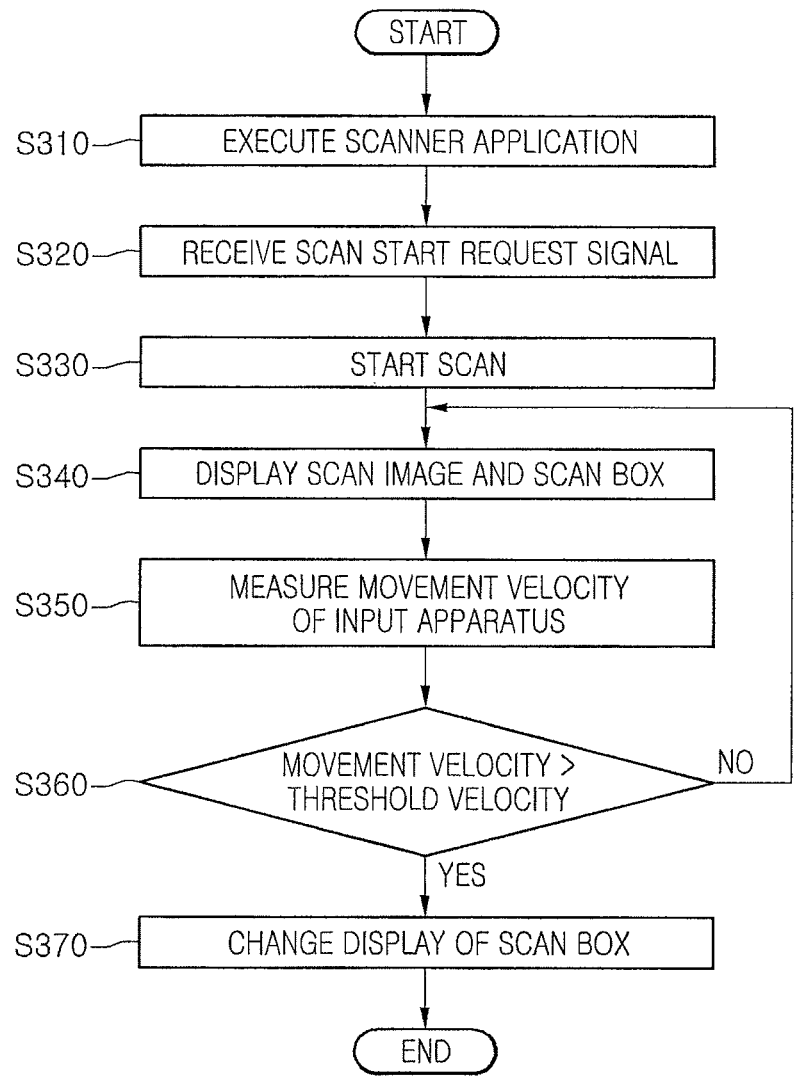
FIG. 3 is a flowchart showing an example method for displaying a scan image.
Figure 4:
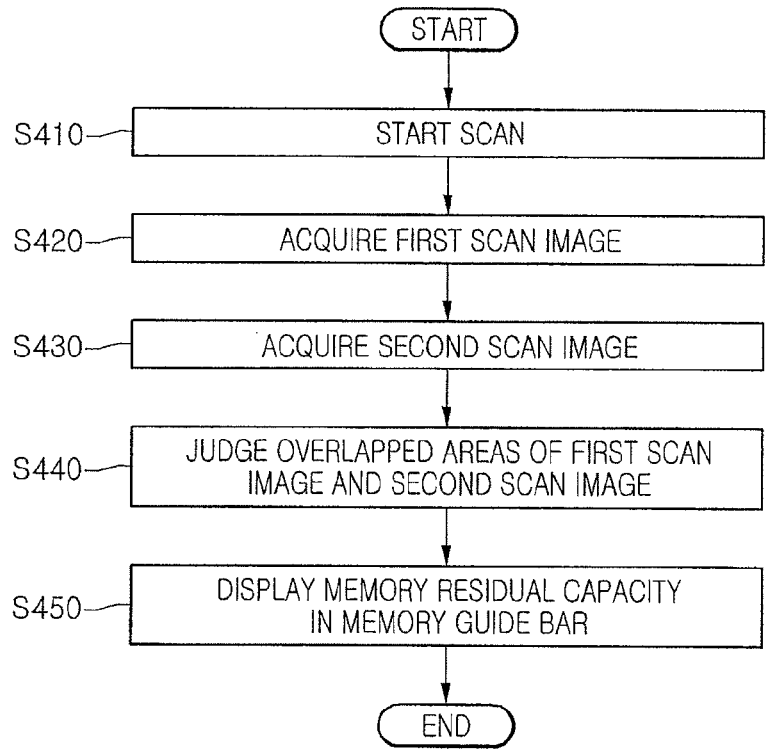
FIG. 4 is a flowchart showing another example method for displaying a scan image.
Figure 5:
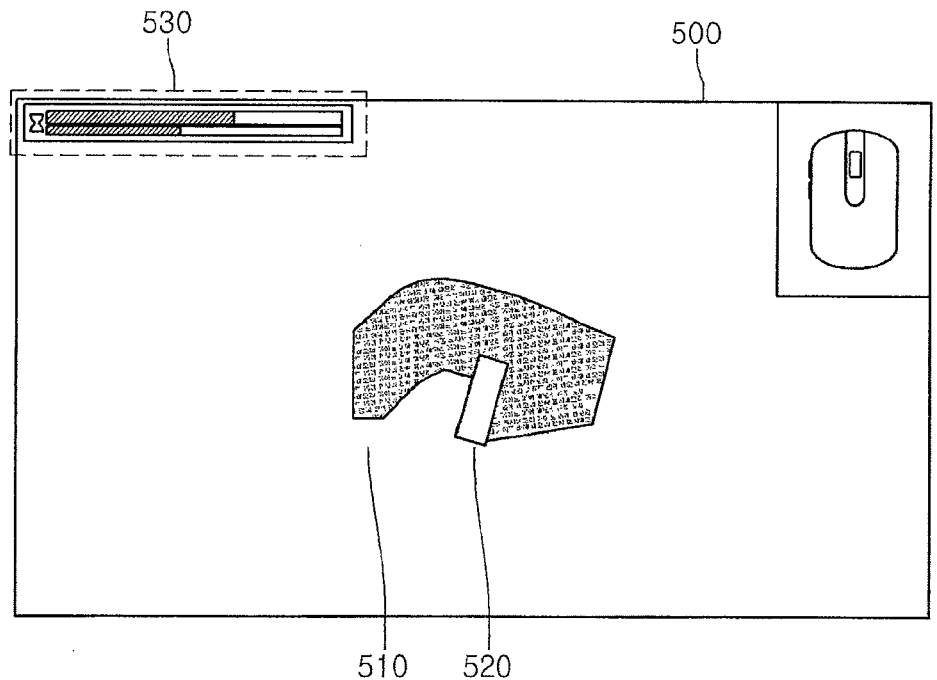
FIG. 5 is a diagram showing a screen providing an example scan user interface (UI) window on which a scan image is displayed.
Figure 6:
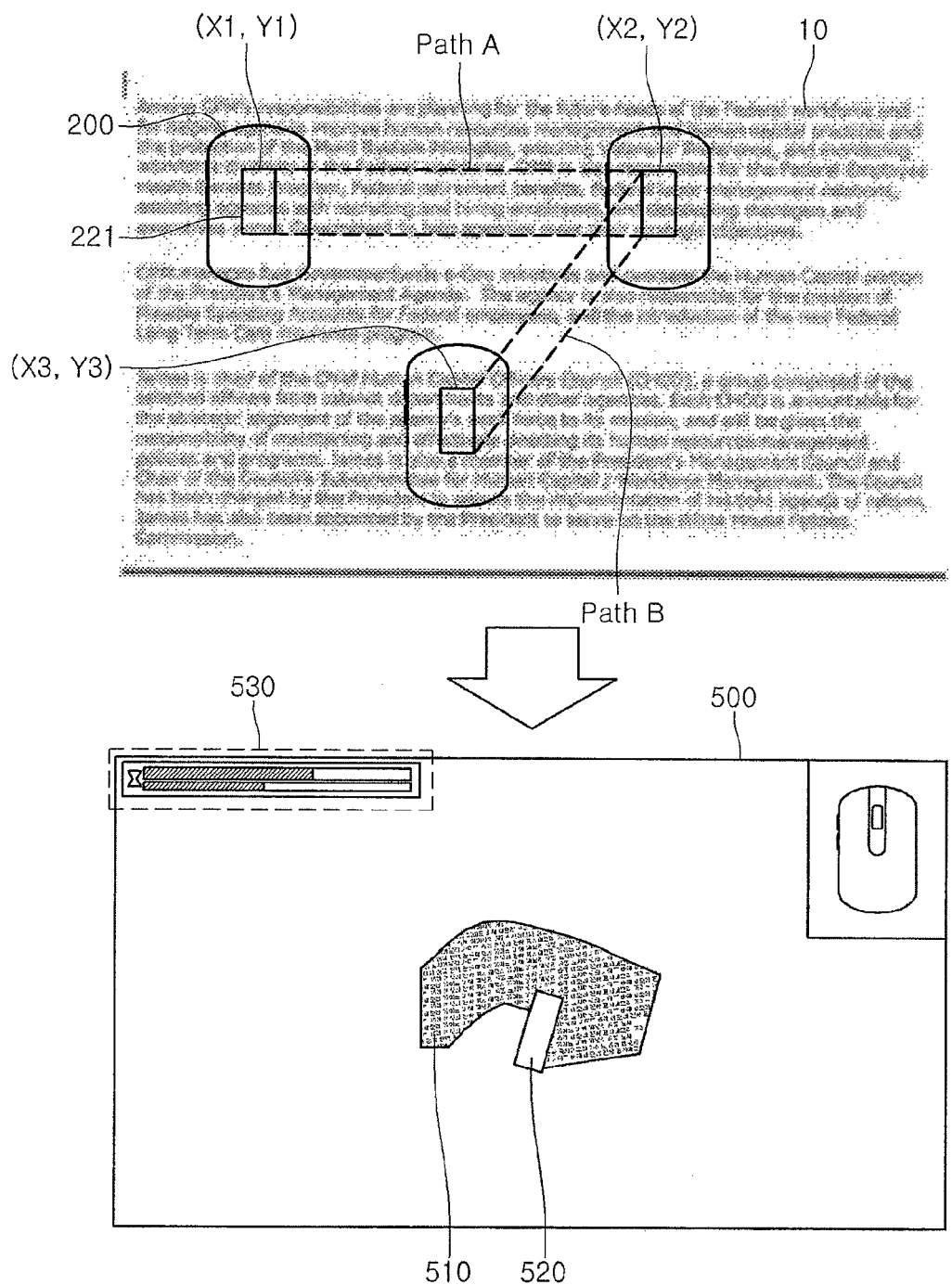
FIG. 6 is a diagram showing a screen providing an example scan UI window displaying a scan image and a memory guide bar.

Hereinafter, referring to FIGS. 3 to 6, an example method for displaying a scan image will be described below. FIG. 3 illustrates a first example method for displaying a scan image. FIG. 4 illustrates a second example method for displaying a scan image. FIG. 5 illustrates an example scan UI window on which the scan image is displayed. FIG. 6 shows a screen providing an example scan UI window displaying a scan image and a memory guide bar.

Referring to FIG. 3, the control unit 110 of the display apparatus 100 executes a scanner application (S310). An execution program of the scanner application may be stored in the storage unit 130 and the scan UI window where the scan image is displayed may be displayed by the execution of the scanner application.

Next, by inputting the scanner function selecting button 241 in the function input unit 240 of the input apparatus 200, the input apparatus 200 generates the scan start request signal and transmits the generated scan start request signal to the display apparatus 100. As a result, the transmitted scan start request signal is received through the communication interface unit 150 of the display apparatus 100 (S320).

The input apparatus 200 enters the scan mode according to the scan start request signal to start a scan for acquiring the scan image from the scan target object (S330).

Meanwhile, although the scan UI window is displayed by executing the scanner application in step S310, step s310 may be omitted and the scan UI window may be displayed by receiving the scan start request signal of step S320.

When the scan starts by entering the scan mode, a scan image 510 acquired and transmitted from the input apparatus 200 is displayed on the scan UI window 500 as shown in FIG. 5. Further, a scan box 520 corresponding to the real scan area 221 (shown in FIG. 2B) positioned on the rear surface of the input apparatus 200 is displayed on the scan UI window 500 (S340).

The scan image 510 is an image which the input apparatus acquires through the scanning unit 220 while moving from any one position to another position and the scan image 510 matches the positional data acquired through the position detecting unit 230 of the input apparatus 200 to be displayed on the scan UI window 500.

Meanwhile, on the scan UI window 500, a memory guide bar 530 displaying a residual capacity of the storage unit 260 of the input apparatus 200 is displayed. The memory guide bar 530 may display a memory residual capacity other than the capacity of the scan image to the total capacity of the input apparatus. The more scan images acquired through the scanning unit 220 of the input apparatus 200, the smaller the residual capacity of the storage unit 260 is displayed.

Meanwhile, the control unit 110 measures a movement velocity in the information on the positional movement of the input apparatus 200 transmitted from the input apparatus 200 (S350) and compares a threshold velocity previously stored in the storage unit 130 with the measured movement velocity of the input apparatus 200 (S360). Herein, the movement velocity represents the movement velocity of the input apparatus 200 and may be a movement velocity of the scan box 520 corresponding to the movement of the input apparatus 200.

As the comparison result, when the movement velocity is lower than the threshold velocity, the scan operation is continued without changing the scan box 520.

Meanwhile, as the comparison result, when the movement velocity is higher than the threshold velocity, the display of the scan box 520 is changed (S370). The display of the scan box 520 may be changed by changing a color of an outer line of the scan box 520 or changing the shape of the outer line of the scan box 520.

For example, if the color of the outer line of the scan box 520 displayed on the scan UI window 500 is a green color when the movement velocity is equal to or lower than the threshold velocity, the color of the outer line of the scan box 520 displayed on the scan UI window 500 may be displayed by changing the green color to a red color.

This is to reduce the likelihood of the scan image being abnormally acquired from the scan target object when the user excessively moves the input apparatus 200. Therefore, the user senses that the color of the outer line of the scan box 520 is changed and decreases the movement velocity of the input apparatus 200 to the threshold velocity or lower to normally acquire the scan image from the scan target object.

Meanwhile, a predetermined warning message may be displayed on the scan UI window 500 as well as the color or shape of the outer line of the scan box 520 is changed and displayed and the case in which the movement velocity of the input apparatus 200 is equal to or higher than the threshold velocity may be notified to the user by outputting a predetermined sound.

Referring to FIGS. 4 and 6, the memory guide bar 530 displayed on the scan UI window 500 will be described in more detail.

Referring to FIG. 4, after the scan mode starts (S410), the input apparatus 200 acquires a first scan image while moving from a first position (X1, Y1) to a second position (X2, Y2) on the scan target object 10 through a first path (path A), as shown in FIG. 6A (S420). Further, the input apparatus 200 acquires a scan image while moving from the second position (X2, Y2) to a third position (X3, Y3) on the scan target object 10 through a second path (path B) (S430).

It is judged whether an overlapped area is present between the first scan image acquired while moving on the first path (path A) and the second image acquired while moving on the second path (path B) (S440) and when the overlapped area is present, the calculated capacity of the total scan image to the total capacity of the input apparatus 200 is displayed to the memory guide bar 530 (S450) by calculating as the capacity of a total scan image a capacity excepting a capacity of the overlapped area from the sum of the capacity of the first scan image and the capacity of the second scan image as shown in FIG. 6B to thereby display the residual capacity of the storage unit 260 of the input apparatus 200.

Figure 7:
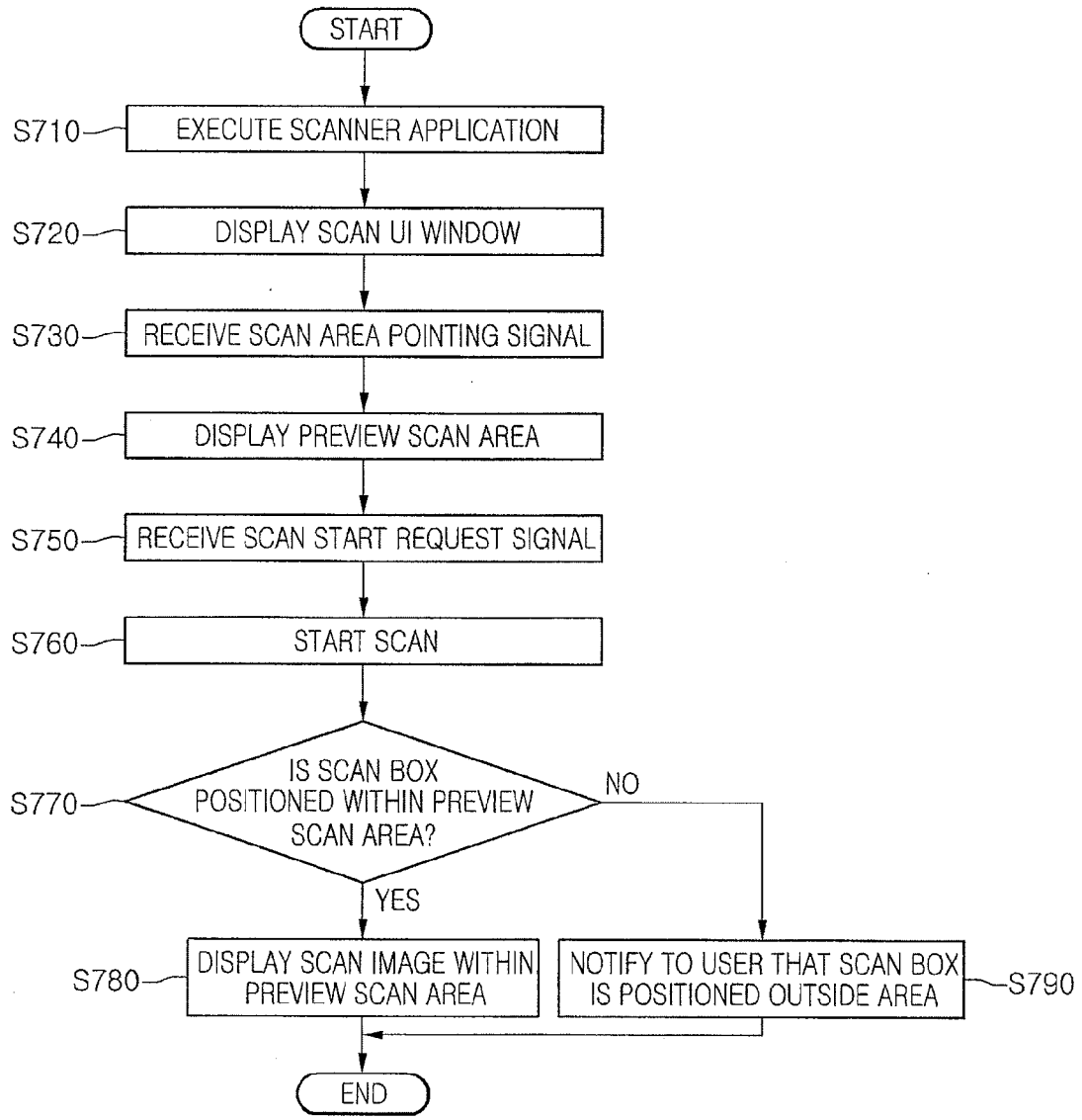
FIG. 7 is a flowchart showing another example method for displaying a scan image.

Hereinafter, referring to FIGS. 7 to 12, an example method for displaying a scan image will be described below. FIG. 7 shows an example method for displaying a scan image. FIGS. 8 to 12 show a screen providing an example scan UI window displaying a preview scan area for acquiring a scan image.

First, referring to FIG. 7, the control unit 110 of the display apparatus 100 executes the scanner application (S710). The execution program of the scanner application may be stored in the storage unit 130 and the scan UI window is displayed by the execution of the scanner application (S720).

Next, the control unit 110 receives a scan area pointing signal pointing a scan area of the scan target object from the input apparatus (S730). A preview scan area corresponding to the received scan area pointing signal is displayed on the scan UI window (S740).

Herein, the scan area pointing signal may be generated through a click signal for each of a plurality of points of the scan target object. For example, when the input apparatus 200 generates a signal to click any one of the left and right buttons of the function input unit 240 while moving to four points 540a to 540d of the scan target object, four points 540a to 540d of the scan target object are displayed on the scan UI window 500 as shown in FIG. 8A and when the receiving of the scan area pointing signal is completed, a preview scan area 541 in which four points 540a to 540d corresponding to the scan area pointing signal are linked with each other is displayed as shown in FIG. 8B.

Meanwhile, the scan area pointing signal may be generated through a click signal and a drag signal for a predetermined point of the scan target object. For example, when the input apparatus 200 generates the signal to click any one of the left and right buttons of the function input unit 240 at a predetermined point 550a of the scan target object and receives an operation to drag in a predetermined direction from the predetermined point 550a, the predetermined point 550a of the scan target object and a drag operation indicator 550b from the predetermined point 550a are displayed on the scan UI window 500 as shown in FIG. 9A and when the receiving of the scan area pointing signal is completed, a preview scan area 551 corresponding to the drag operation indicator 550b corresponding to the scan area pointing signal is displayed on the scan UI window 500 as shown in FIG. 9B.

Figure 10:
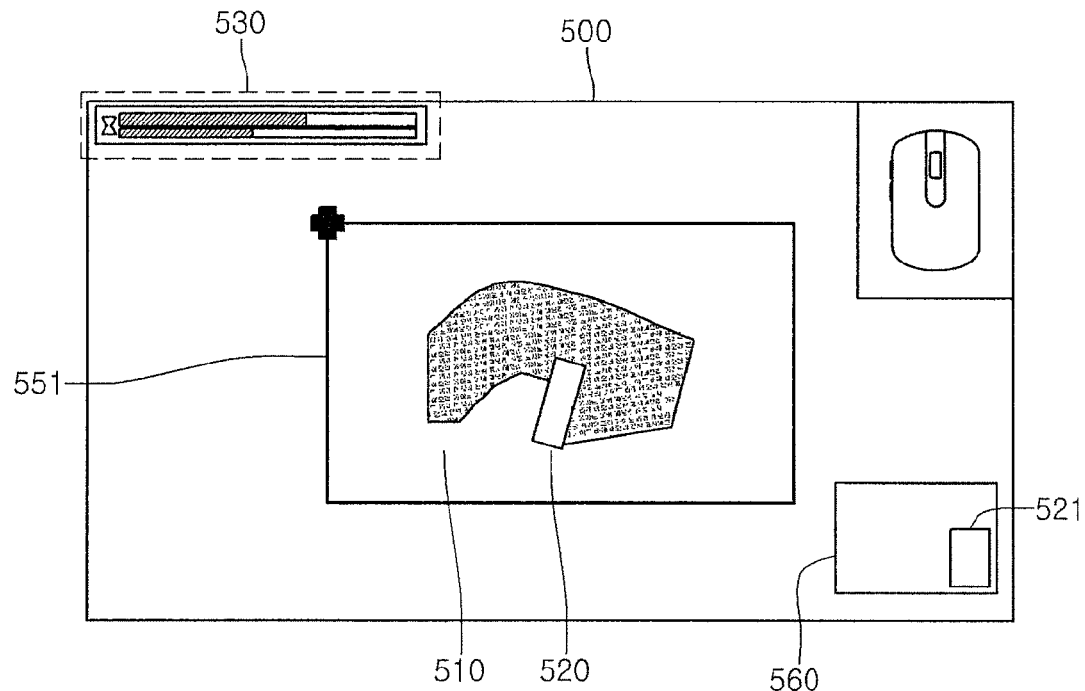

Meanwhile, as shown in FIG. 10, a scan guide map 560 in which the preview scan area 551 and the scan box 520 are downscaled at a predetermined rate may be displayed at one portion of the scan UI window 500. A downscaling scan box 521 through which the relative position of the scan box 520 can be determined within the preview scan area 551 may be displayed in the scan guide map 560. As a result, the user can easily judge where the scan box 520 is positioned within the preview scan area 551. In particular, when the preview scan area 551 is designated to be larger than the scan UI window 500, the relative position of the scan box 520 within the preview scan area 551 can be determined more easily through the scan guide map 560.

Meanwhile, a scan start request signal is received from the input apparatus 200 (S750) and a scan operation for acquiring the scan image from the scan target object is performed according to the scan start request signal (S760).

Further, the control unit 110 of the display apparatus 100 judges whether the scan box 520 corresponding to the position of the input apparatus 200 is positioned within the preview scan area 551 through the positional data transmitted from the input apparatus 200 (S770).

As the judgment result of step S770, when the scan box 520 is positioned within the preview scan area 551, a scan image of a scan target object corresponding to the preview scan area 551 is acquired and the acquired scan image is displayed on the scan UI window 500 (S780).

Figure 11:
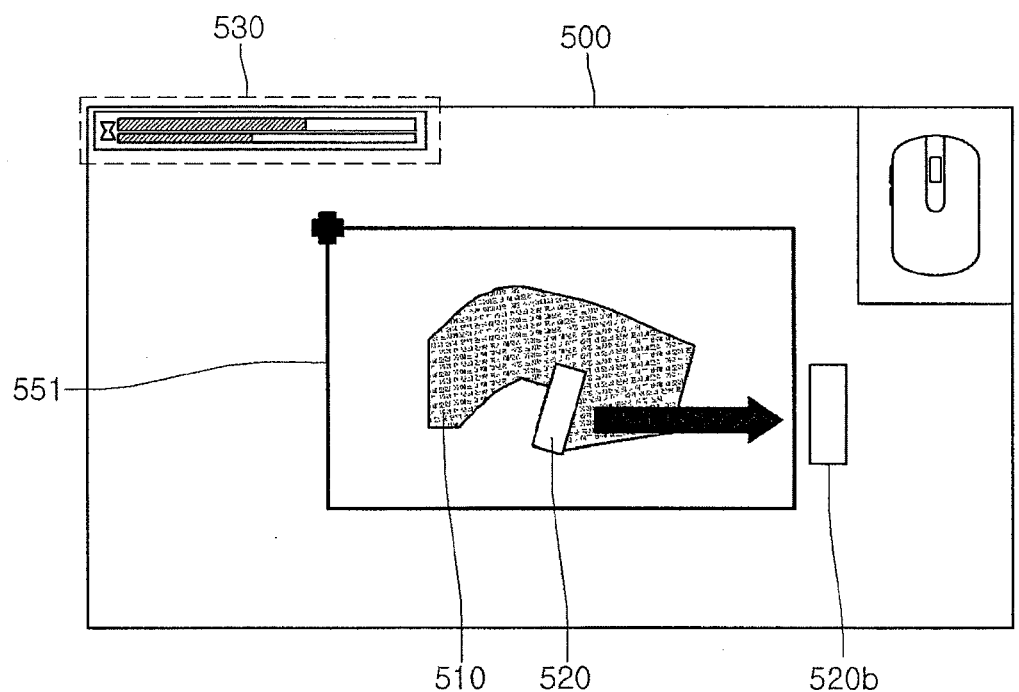

As the judgment result of step S770, when the scan box 520 is not positioned within the preview scan area 551, a notification message indicating that the scan box 520 is outside the preview scan area 551 is outputted to the user (S790). For example, as shown in FIG. 11, when the position of the scan box 520b moves to an area other than the preview scan area 551, the notification message is outputted to the user. The notification message may be outputted in various methods. The display of the scan box may be changed or a warning message may be displayed. Further, the input apparatus 200 may be vibrated by outputting a predetermined sound or transmitting a signal related to predetermined vibration to the input apparatus 200 to thereby output the notification message to the user.

Figure 12:
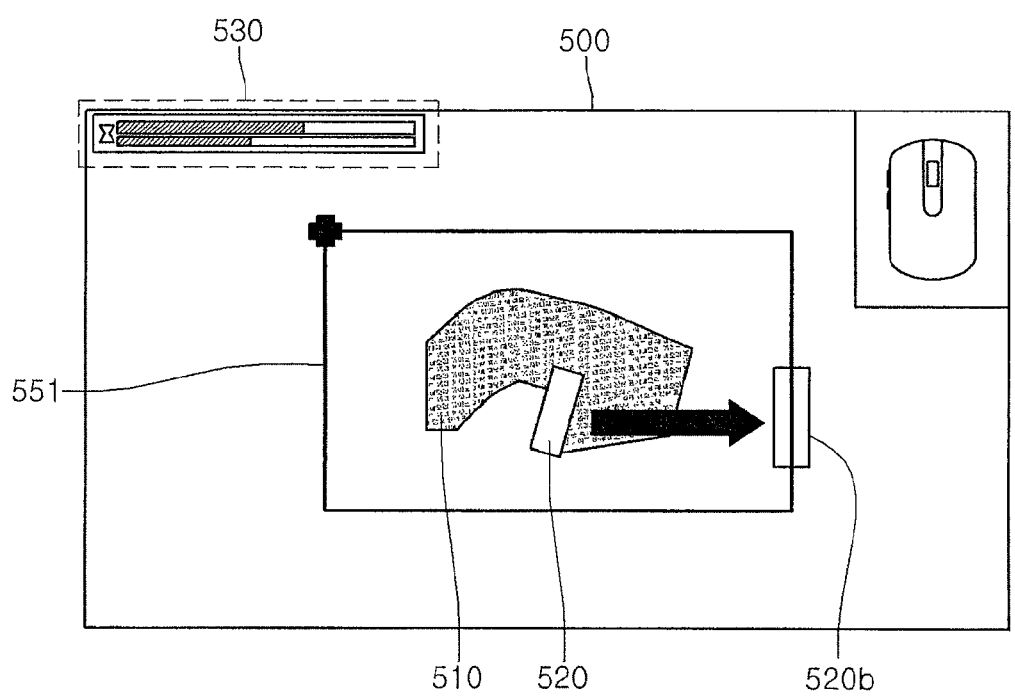

In addition, as shown in FIG. 12, when a part of the scan box 520b is positioned outside the preview scan area 551, a scan image of a scan target object corresponding to the part of the scan box 520b may not be acquired.

That is, the partial area of the scan box 520b corresponding to the area outside the preview scan area 551 may not be scanned.

Figure 13:
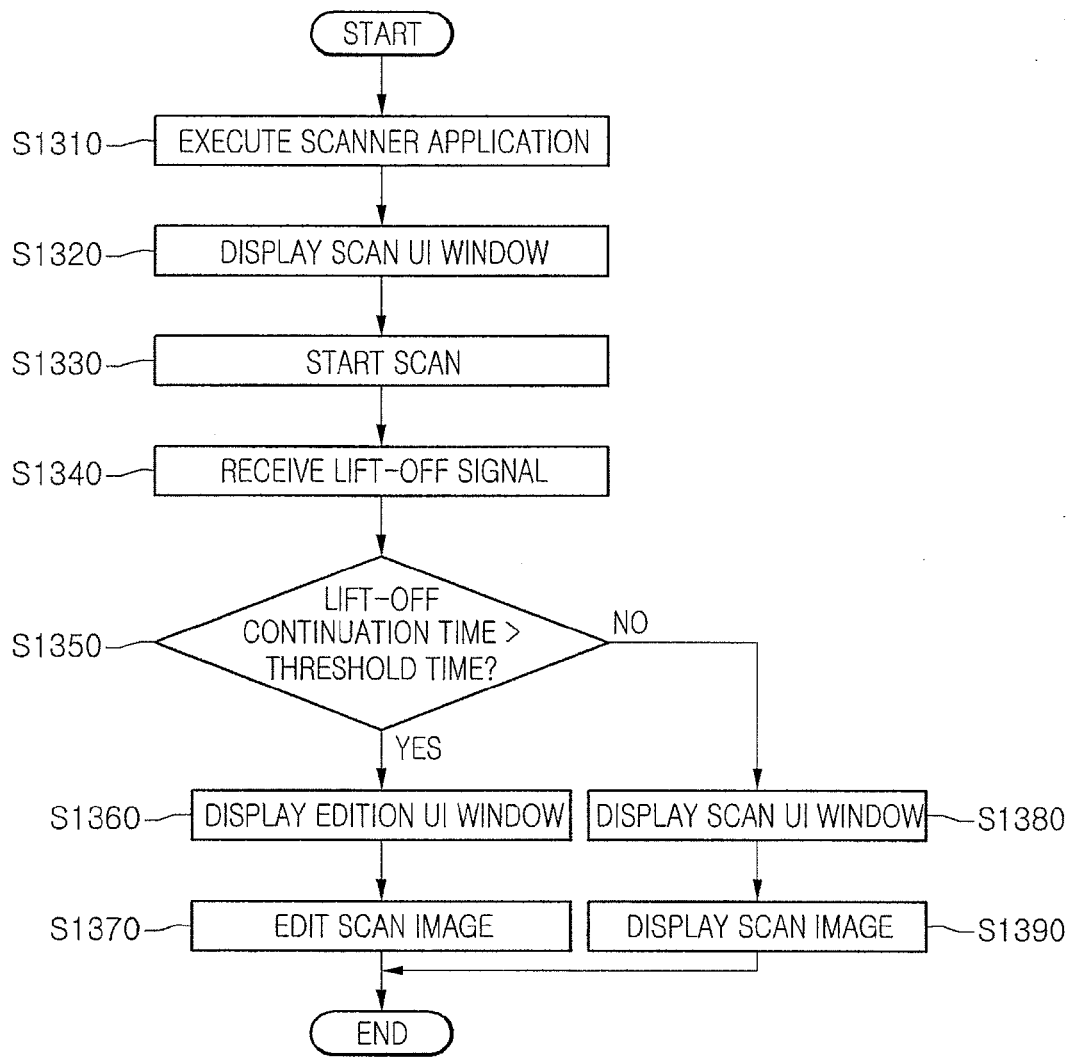
FIG. 13 is a flowchart showing an example method for displaying a scan image or an edition image.
Figure 15:
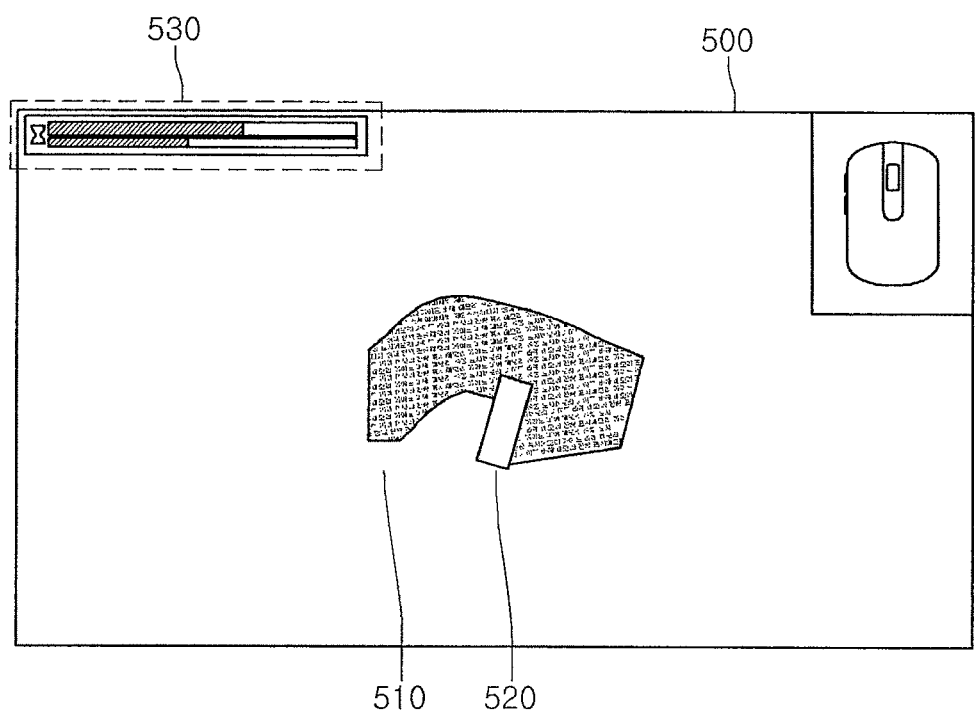
FIG. 15 is a diagram showing a screen providing an example scan UI window on which a scan image is displayed.
Figure 16:
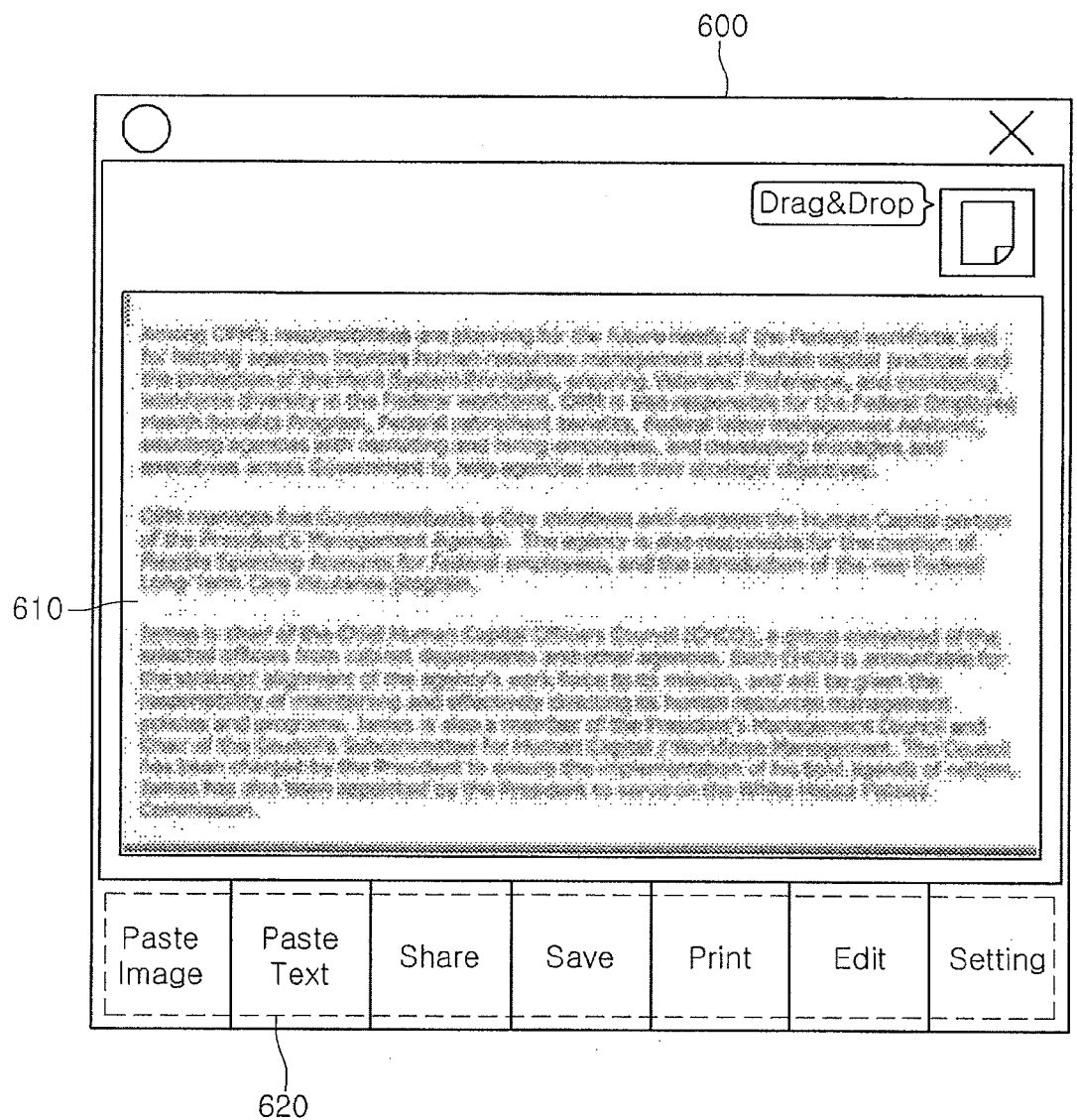
FIG. 16 is a diagram showing a screen providing an example edition UI window on which an edition image is displayed.

Hereinafter, referring to FIGS. 13 to 16, an example method for displaying a scan image or an edition image will be described below. FIG. 13 shows an example method for displaying a scan image or an edition image. FIG. 14 shows an example state of an input apparatus when a lift-off signal is generated. FIG. 15 shows a screen providing an example scan UI window on which the scan image. FIG. 16 shows a screen providing an example edition UI window on which the edition image is displayed.

First, referring to FIG. 13, the control unit 110 of the display apparatus 100 executes the scanner application (S1310). The execution program of the scanner application may be stored in the storage unit 130 and the scan UI window is displayed by the execution of the scanner application (S1320). The transmitted scan start request signal is received through the communication interface unit 150 of the display apparatus 100 and the scan for acquiring the scan image from the scan target object starts by entering the scan mode according to the scan start request signal (S1330).

In the scan mode state, when the input apparatus 200 is spaced apart from the scan target object by a predetermined distance or more, the control unit 250 of the input apparatus 200 generates a predetermined lift-off signal and transmits the generated lift-off signal to the display apparatus 200. The display apparatus 200 receives the lift-off signal (S1340). As shown in FIG. 14A, the input apparatus 200 performs the acquiring of the scan image of the scan target object 10, that is, the scan operation. Meanwhile, as shown in FIG. 14B, when the input apparatus 200 is spaced apart from the scan target object 10 by a predetermined distance, the lift-off signal is generated. Herein, when the predetermined distance is one mm or more, the lift-off signal may be generated.

The control unit 110 of the display apparatus 100 compares a previously stored threshold time with a continuation time of the received lift-off signal (S1350) and as the comparison result, when the continuation time of the lift-off signal is less than the predetermined threshold time, it is judged that the scan mode is continued and as shown in FIG. 15, the scan UI window 500 displayed while performing the scan operation is displayed (S1380). Thereafter, the scan image 510 and the scan box 520 acquired by performing the scan operation are displayed on the scan UI window 500 (S1390).

As the comparison result, the continuation time of the received lift-off signal and the predetermined threshold time are compared with each other and when the continuation time of the lift-off signal is more than the predetermined threshold time, an edition UI window 600 including an edition image 610 for editing the acquired scan image and an edition setting window 620 having a plurality of functions for editing the edition image is displayed as shown in FIG. 16 (S1360).

Herein, the edition image represented a scan image acquired from the scan target object and decided for edition.

The edition image is displayed on the edition UI window 600 to switch the scan mode to the edition mode and the edition image 610 displayed on the edition UI window 600 is edited by using any one of the plurality of functions displayed on the edition setting window 620 (S1370).

Figure 17:
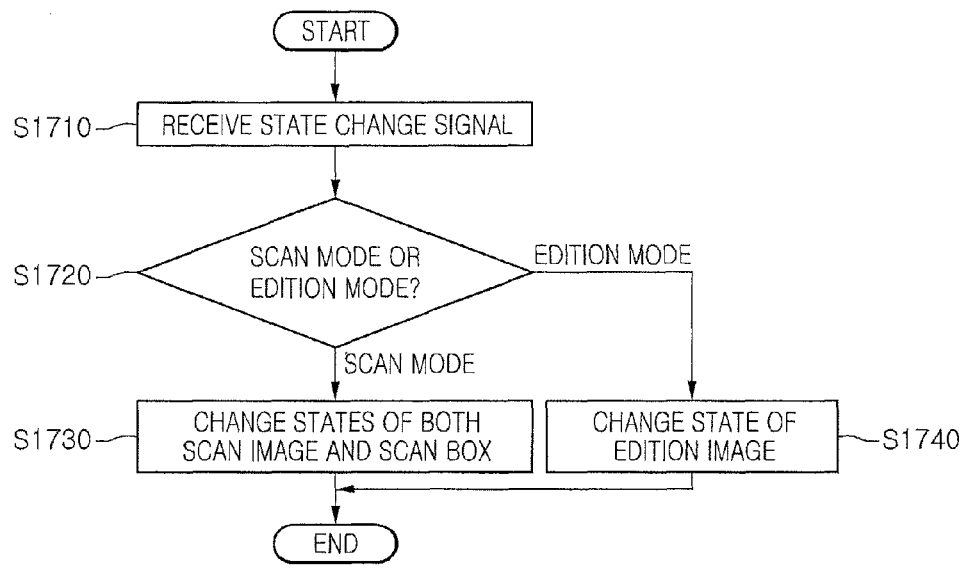
FIG. 17 is a flowchart showing an example method for displaying a scan image depending on a state change signal of an input apparatus.

Hereinafter, referring to FIGS. 17 to 19, an example method for displaying a scan image depending on a state change signal of an input apparatus will be described below. FIG. 17 shows an example method for displaying a scan image depending on the state change signal of the input apparatus. FIG. 18 shows a screen providing an example scan UI window on which a scan image is displayed depending on the state change signal of the input apparatus. FIG. 19 shows a screen providing an example edition UI window on which an edition image is displayed depending on the state change signal of the input apparatus.

First, the input apparatus 200 generates a state change state by inputting buttons of the function input unit 240 and transmits the generated state change signal to the display apparatus 100. The display apparatus 100 receives the state change signal (S1710). Herein the state change signal may be a zoom-in/out signal or a wheel input signal through the wheel button of the buttons of the function input unit 240.

Meanwhile, the control unit 110 of the display apparatus 100 judges the scan mode or the edition mode at the time when the state change signal is inputted (S1720).

As the judgment result, in the case of the scan mode at the time when the state change signal is inputted, that is, in the case of the scan UI window 500 including the scan image 510 and the scan box 520 as shown in FIG. 18A, any one of the sizes or directions of the scan image 510 and the scan box 520 that are displayed is adjusted and displayed together according to the state change signal (S1730).

For example, when the state change signal is the zoom-in signal through the wheel button of the input apparatus, the sizes of the scan image 510 and the scan box 520 shown in FIG. 18A may be together upscaled and displayed together at a predetermined rate, as shown in FIG. 18B.

Further, when the state change signal is the zoom-out signal through the wheel button of the input apparatus 200, the sizes of the scan image 510 and the scan box 520 may be together downscaled and displayed at a predetermined rate.

Further, when the state change signal is the wheel input signal through the wheel button of the input apparatus 200, the directions of the scan image 510 and the scan box 520 may be together rotated and displayed at a predetermined angle.

As the judgment result, in the case of the edition mode at the time when the state change signal is inputted, that is, in the case of the edition UI window 600 including the edition image 610 and the edition setting window 630 as shown in FIG. 19A, the state of the displayed edition image 610 is adjusted and displayed.

For example, when the state change signal is the zoom-in signal through the wheel button of the input apparatus, the size of the edition image 610 shown in FIG. 19A may be upscaled and displayed together, as shown in FIG. 19B.

Further, when the state change signal is the zoom-out signal through the wheel button of the input apparatus 200, the size of the edition image 610 may be together downscaled and displayed at a predetermined rate.

Meanwhile, the function of the zoom-in/out signal through the wheel button of the input apparatus 200 may be changed according to user setting. That is, the resolution of the edition image 610 may be changed and displayed to correspond to the zoom-in/out signal through the wheel button of the input apparatus 200.

Figure 20:
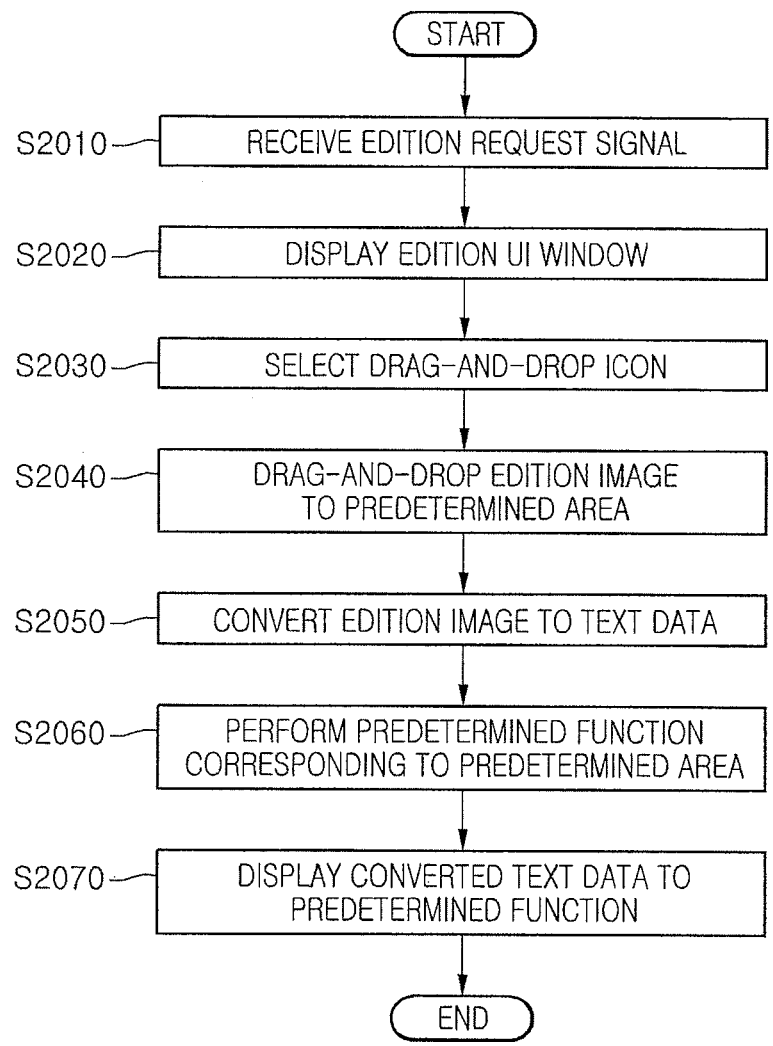
FIG. 20 is a flowchart showing an example method for editing a scan image.

Hereinafter, referring to FIGS. 20 to 24, an example method for editing a scan image will be described below. FIG. 20 shows an example method for editing a scan image. FIGS. 21 to 24 show a screen providing an example edition UI window for editing a scan image.

Referring to FIG. 20, the control unit 110 of the display apparatus 100 receives an edition request signal from the input apparatus 200 through the communication interface unit 150 (S2010). The edition request signal may be generated by receiving the scanner function selecting button 241 of the input apparatus 200.

The edition UI window 600 is displayed to correspond to the edition request signal (S2020). The edition image 610 and the edition setting window 620 for editing the edition image, and a plurality of functional icons performing a plurality of functions are displayed at a predetermined area 640 of the edition UI window 600 (see FIG. 21).

Herein, the plurality of functional icons may be icons for executing an electronic document function, an e-mail function, and a social network service function.

The user selects a drag-and-drop icon at one portion of the edition UI window 600 (S2030). The selection of the drag-and-drop icon allows the edition image to be dragged and dropped to any one of a plurality of areas in the edition UI window 600. Meanwhile, the selection of the drag-and-drop icon may be omitted.

That is, a drag-and-drop operation for the edition image 610 may be performed without selecting an additional drag-and-drop icon in the edition UI window 600.

Meanwhile, the user selects the edition image 610 through a pointer 20 such as the mouse and thereafter, may locate the selected edition image 610 at the predetermined area 640 (S2040).

When the edition image 610 is dragged through the pointer 20 and thereafter, the edition image 610 is dropped to the area where any one of the plurality of functional icons is displayed, the edition image 610 is converted into image data and text data (S2050) and at the same time, a functional icon corresponding to the area to which the edition image 610 is dropped is executed (S2060).

Further, a function corresponding to the executed functional icon is executed and at the same time, the converted text data may be displayed in a format corresponding to the executed function (S2070).

Herein, the predetermined area may be an area where the functional icon is displayed.

For example, as shown in FIG. 21A, when the edition image 610 is dragged and dropped to an area where a functional icon related with a word file function among the plurality of functional icons is displayed, the word file function is executed to thereby display a word file window 800 and at the same time, text data 810 converted from the edition image on the word file window 800, as shown in FIG. 21B.

Meanwhile, the predetermined area may be an area where the executed predetermined function is displayed.

Figure 22:
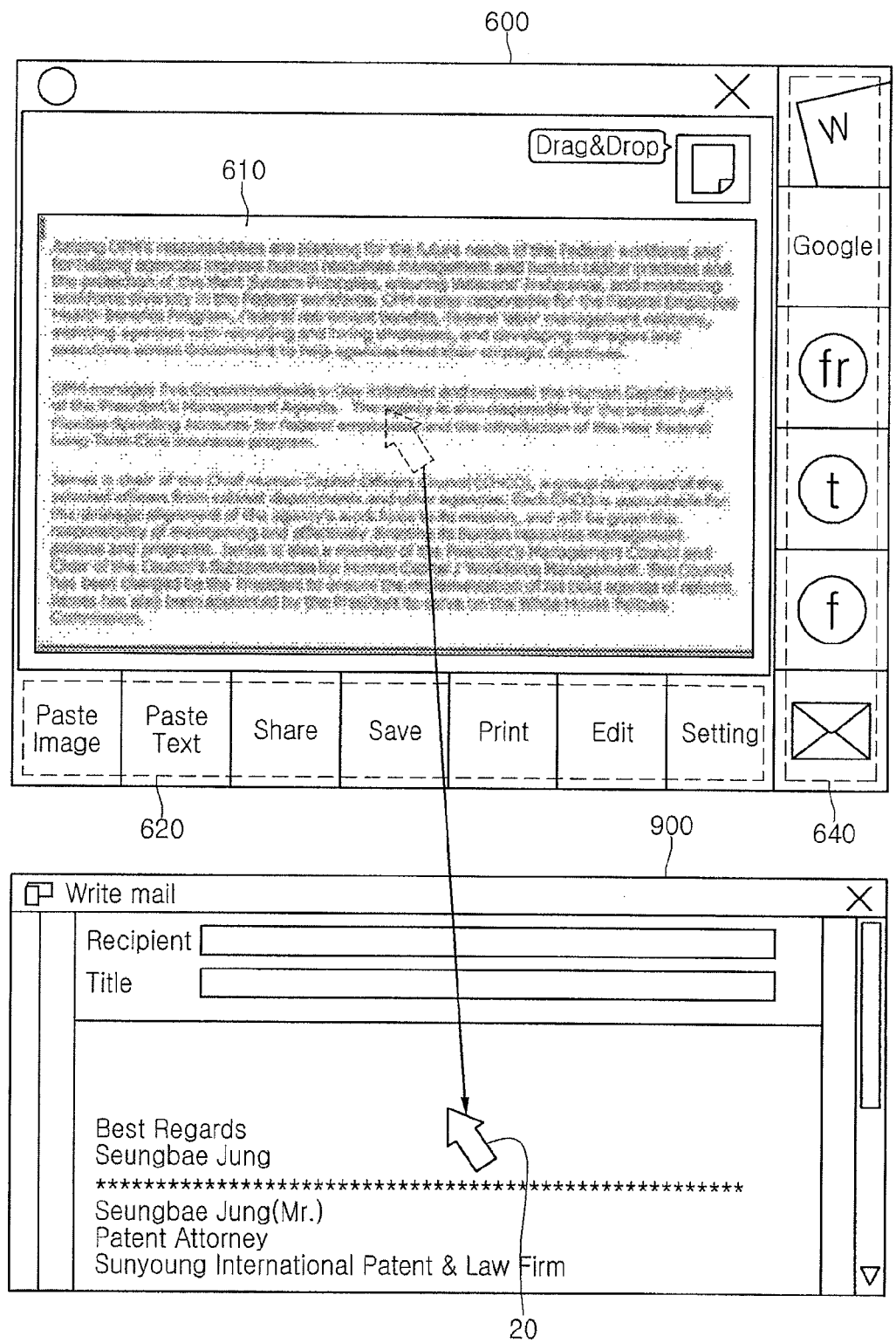

For example, as shown in FIG. 22, when the e-mail function is executed by selecting an icon related with the e-mail function among the plurality of functional icons, an e-mail window 900 is displayed. Thereafter, when the edition image 610 displayed on the edition UI window 600 is dragged through the point 20 and dropped to the area where the executed predetermined function is displayed, that is, the e-mail window 900, the text data 910 converted from the edition image may be displayed on the e-mail window 900 as shown in FIG. 23.

Figure 24:
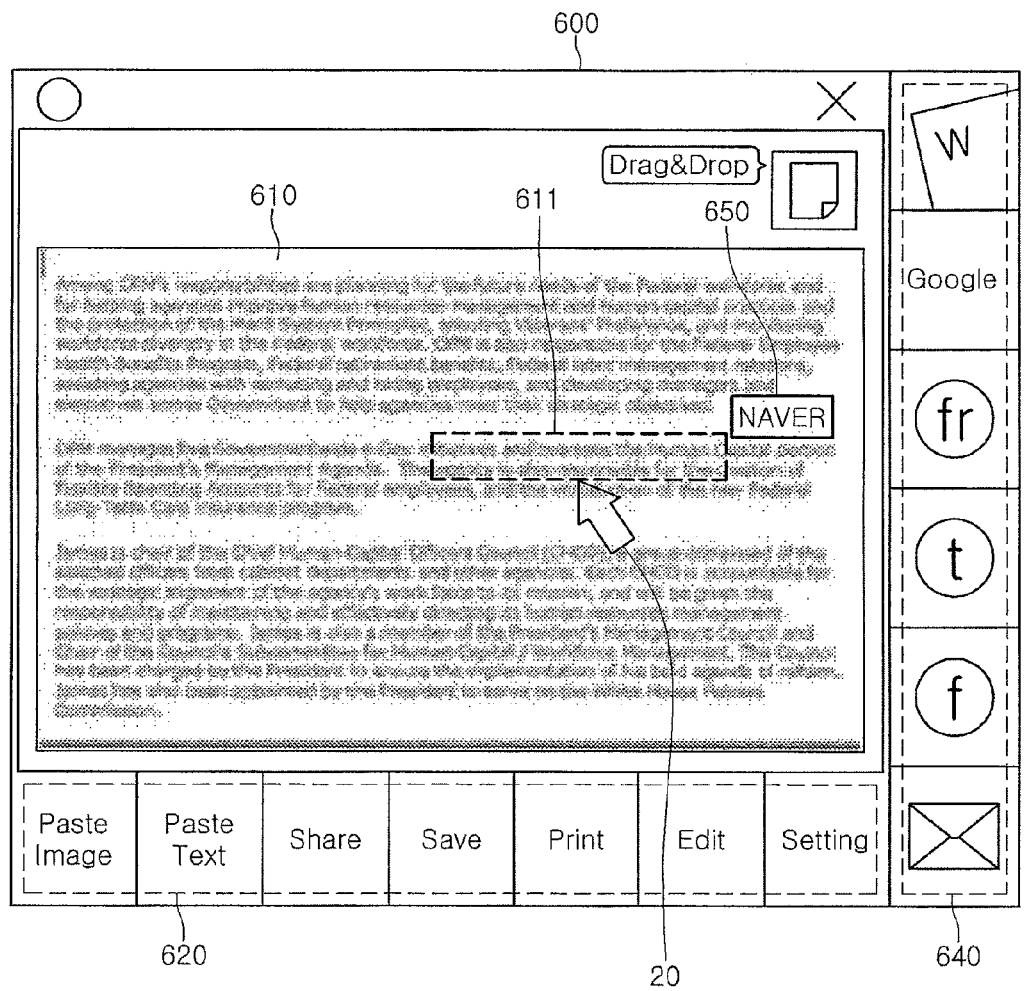

Meanwhile, as shown in FIG. 24, a predetermined character string 611 is selected among the text data converted from the edition image 610 displayed on the edition UI window 600 through the pointer 20, a search icon 650 may be displayed at one portion of the selected predetermined character string 611 to correspond to the selection of the predetermined character string 611. Thereafter, when an input to select the search icon 650 is received, the selected predetermined character string is searched by accessing a search site corresponding to the search icon 650 to display a search result.

In addition, a translation icon may be displayed instead of the search icon 650. In this case, when an input to select the translation icon is received, the selected character string is translated by executing a translation program corresponding to the translation icon to display a translation result.

Further, the methods for displaying the scan image described throughout may be implemented as a program to be executed in a computer.

The methods for displaying a scan image may be prepared as a program for executing the method in the computer to be stored in the computer-readable recording medium and examples of the computer-readable recording medium include a ROM, a RAM, a CD-ROM, a magnetic tape, a floppy disk, an optical data storage, and the like and in addition, include a type of a carrier wave (e.g., transmission through the Internet).

The computer-readable recording media are distributed on computer systems connected through the network, and thus the computer-readable recording media may be stored and executed as the computer-readable code by a distribution scheme. In addition, functional programs, codes, and code segments for implementing the method can be easily deduced by programmer skilled in the art.

Further, as described above, although various examples have been illustrated and described, the present disclosure is not limited to the above-mentioned examples and various modifications can be made by those skilled in the art without departing from the scope of the appended claims. In addition, these modified examples should not be appreciated separately from technical spirits or prospects.

The invention claimed is:

1. An input device, comprising:
a function input unit to receive a request for scanning;
a scanning unit to acquire a scan image of a target object through a scan area;
a communication interface unit to transmit the scan image to a display device; and
a control unit to provide information on a movement of the input device to the display device, wherein a color of a scan box corresponding to the scan area is changed based on the information on the movement of the input device.

2. The input device of the claim 1, wherein the color of the scan box is changed when a movement velocity of the input device is greater than a threshold velocity.

3. The input device of the claim 1, wherein the scan box is used for indicating a current scan area.

4. The input device of claim 1, wherein the function input unit includes a scan button which receives the request to start the scanning.

5. The input device of claim 1, wherein the function input unit includes a scan button which receives the request to stop the scanning, and
the control unit transmits edition request signal to the display device when the scan button receives the request to stop the scanning, wherein the edition request signal is used for opening an edition UI (User Interface) window on the display device.

6. The input device of claim 1, wherein the input device is a mouse having scan function.

7. The input device of claim 1, wherein the function input unit includes a wheel to zoom in the scan image or to zoom out the scan image.

8. A method, comprising:
receiving a request for scanning;
acquiring a scan image of a target object through a scan area; and
providing the scan image and information on a movement of an input device to a display device,
wherein a color of a scan box corresponding to the scan area is changed based on the information on the movement of the input device.

9. The method of claim 8, wherein the color of the scan box is changed based on a movement velocity of the input device.

10. The method of claim 9, wherein the color of the scan box is changed when a movement velocity of the input device is greater than a threshold velocity.

11. The input device of claim 1, wherein a shape of an outer line of the scan box is changed based on the information on the movement of the input device.

12. The method of claim 8, wherein a shape of an outer line of the scan box is changed based on the information on the movement of the input device.

13. The input device of claim 1, wherein a warning message is displayed based on the information on the movement of the input device.

14. The method of claim 8, wherein a warning message is displayed based on the information on the movement of the input device.

15. A system comprising:
an input device configured to:
receive a request for scanning,
acquire a scan image of a target object through a scan area,
transmit the scan image to a display device, and
provide information on a movement of the input device to the display device; and
the display device configured to:
display a scan screen including the scan image and a scan box corresponding to the scan area, and
change a color of the scan box based on the information on the movement of the input device.

16. The system of claim 15, wherein the color of the scan box is changed when a movement velocity of the input device is greater than a threshold velocity.

17. The system of claim 15, wherein the scan box indicates a current scan area.

18. The system of claim 15, the input device includes a scan button which receives the request to start the scanning.

19. The system of the claim 15, the input device includes a scan button which receives the request to stop the scanning, the input device transmits edition request signal to the display device when the scan button receives the request to stop the scanning, and the display device opens an edition UI (User Interface) window according to the edition request signal.

20. The system of claim 15, wherein the input device is a mouse having scan function.

21. The system of claim 15, the input device includes a wheel to zoom in the scan image or to zoom out the scan image.

* * * * *